(12) United States Patent
Pursifull et al.

(10) Patent No.: US 10,011,269 B2
(45) Date of Patent: Jul. 3, 2018

(54) IDENTIFYING IN-RANGE FUEL PRESSURE SENSOR ERROR

(71) Applicant: Ford Global Technologies, LLC, Dearborn, MI (US)

(72) Inventors: Ross Dykstra Pursifull, Dearborn, MI (US); Christopher Arnold Woodring, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 56 days.

(21) Appl. No.: 15/365,596

(22) Filed: Nov. 30, 2016

(65) Prior Publication Data
US 2018/0148037 A1    May 31, 2018

(51) Int. Cl.
| B60L 9/00 | (2006.01) |
| G05D 11/00 | (2006.01) |
| B60W 20/15 | (2016.01) |
| F02D 41/38 | (2006.01) |
| F02D 41/30 | (2006.01) |
| F02D 41/26 | (2006.01) |
| B60K 6/44 | (2007.10) |
| B60W 10/02 | (2006.01) |
| B60W 10/30 | (2006.01) |

(52) U.S. Cl.
CPC ............... *B60W 20/15* (2016.01); *B60K 6/44* (2013.01); *B60W 10/02* (2013.01); *B60W 10/30* (2013.01); *F02D 41/26* (2013.01); *F02D 41/3082* (2013.01); *F02D 41/3854* (2013.01); *B60W 2510/0208* (2013.01); *B60W 2710/30* (2013.01); *F02D 2200/0602* (2013.01); *F02D 2250/02* (2013.01)

(58) Field of Classification Search
None
See application file for complete search history.

(56) References Cited

U.S. PATENT DOCUMENTS

| 6,526,948 B1 | 3/2003 | Stavnheim et al. |
| 7,640,916 B2 | 1/2010 | Ulrey et al. |
| 7,832,375 B2 | 11/2010 | Dusa et al. |
| 2014/0230794 A1 | 8/2014 | Sumilla et al. |
| 2016/0025030 A1 | 1/2016 | Ulrey et al. |

(Continued)

OTHER PUBLICATIONS

Ulrey, Joseph Norman, et al., "Identifying In-Range Fuel Pressure Sensor Error," U.S. Appl. No. 15/365,669, filed Nov. 30, 2016, 110 pages.

*Primary Examiner* — Bhavesh V Amin
(74) *Attorney, Agent, or Firm* — Julia Voutyras; McCoy Russell LLP

(57) ABSTRACT

Methods and systems are provided for diagnosing an in-range error of a pressure sensor arranged downstream of a lift pump in a fuel system of a vehicle. In one example, a method may include performing feedback control of the lift pump based on output of the pressure sensor, monitoring the pressure sensor output for flattening during the application of the voltage pulses, and adjusting operation of the fuel system depending on whether the pressure sensor output flattens for at least a threshold duration, which is indicative of an in-range error. The method may further include dynamically learning a setpoint pressure of a pressure relief valve of the fuel system and a fuel vapor pressure within the fuel system by monitoring pressure sensor output while adjusting the duty cycle of voltage pulses applied to the lift pump.

20 Claims, 20 Drawing Sheets

(56) References Cited

U.S. PATENT DOCUMENTS

2016/0153384 A1 6/2016 Ulrey et al.
2016/0153388 A1 6/2016 Sanborn et al.
2016/0333815 A1 11/2016 Ulrey et al.

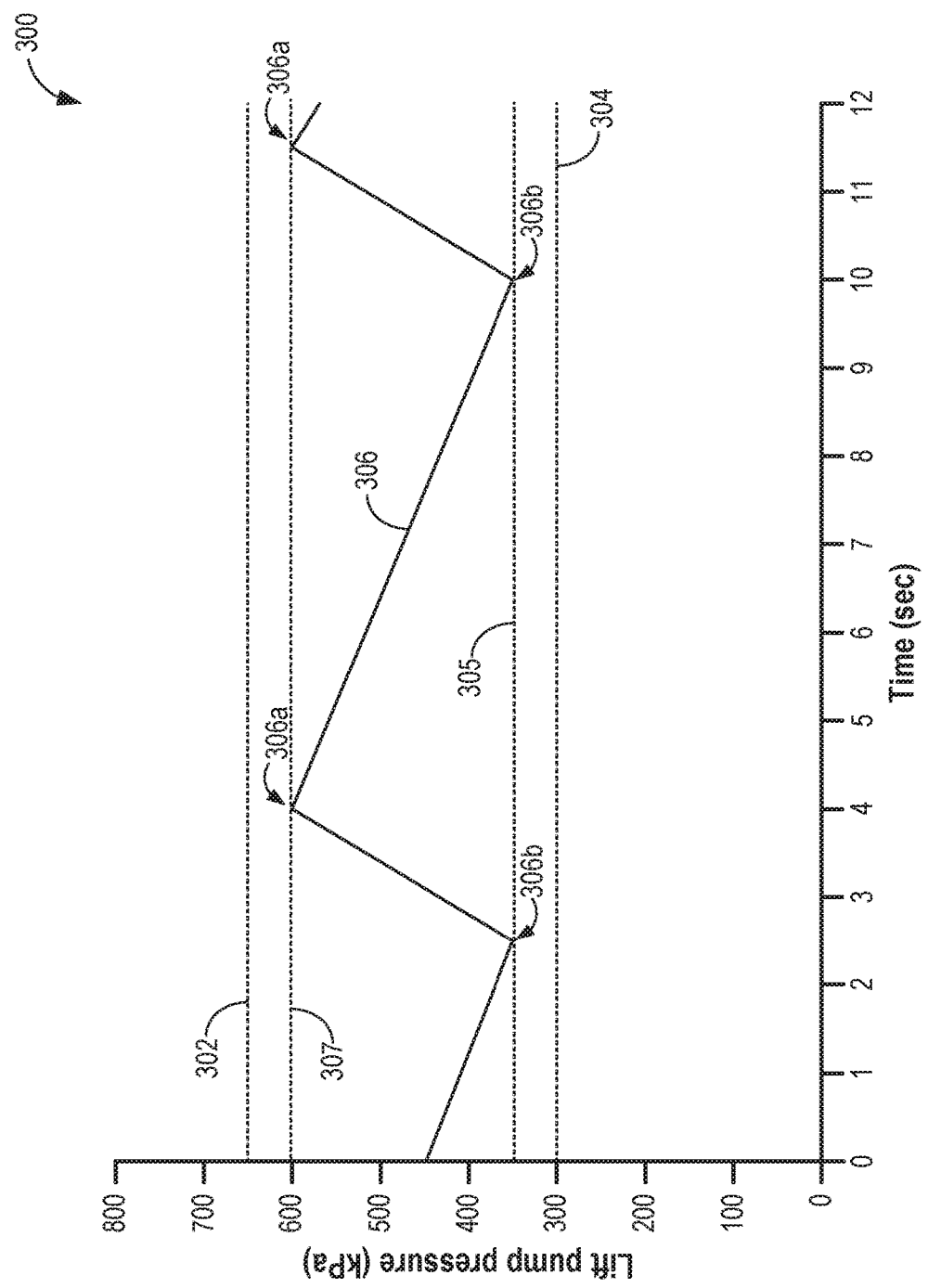

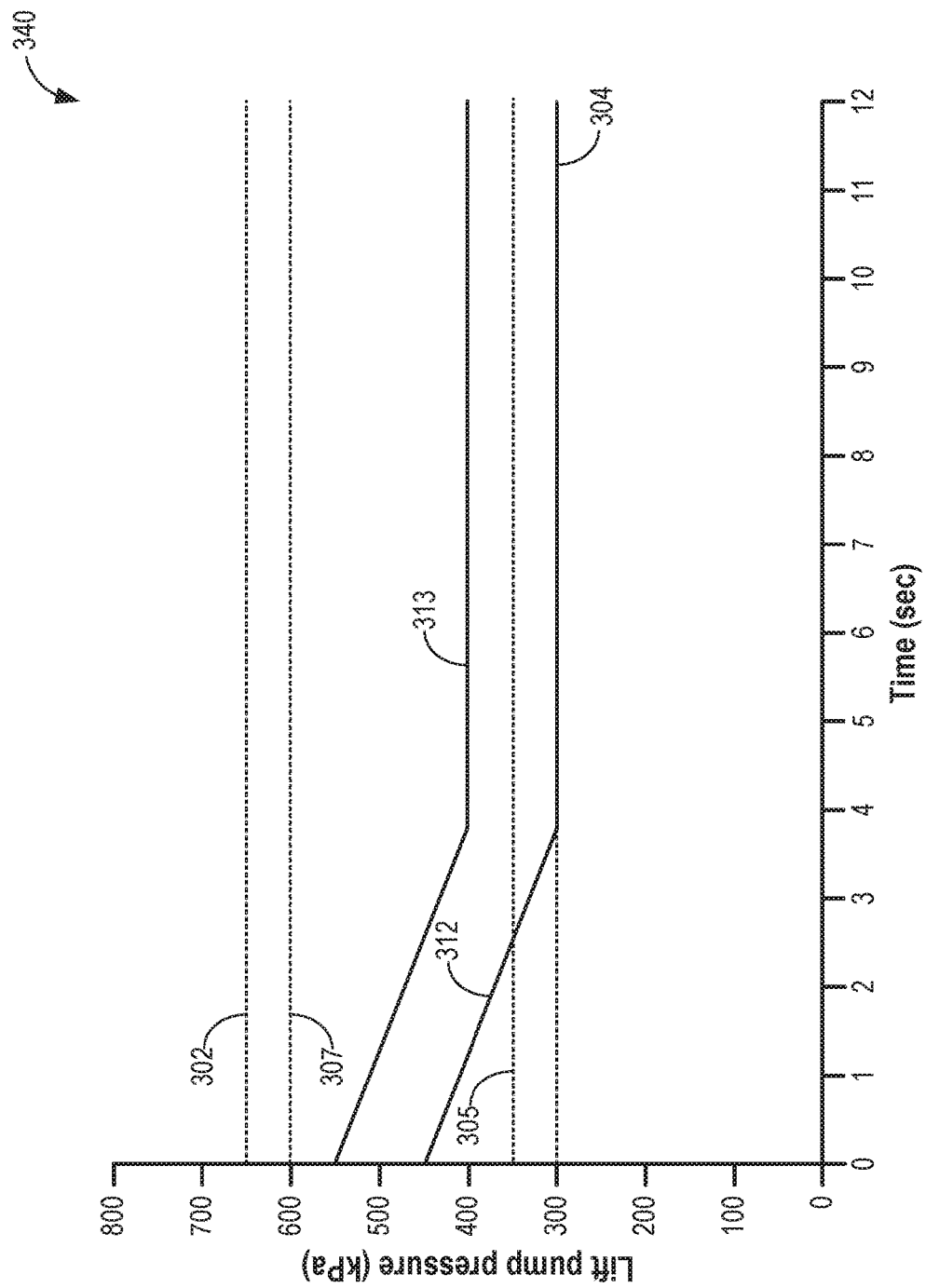

IDENTIFYING IN-RANGE FUEL PRESSURE SENSOR ERROR

FIELD

The present description relates generally to methods for diagnosing an in-range error of a pressure sensor arranged downstream of a fuel lift pump in an internal combustion engine and adjusting fuel system operation in response to the diagnosis.

BACKGROUND/SUMMARY

Internal combustion engines may include a fuel system with a fuel rail for distributing fuel to one or more fuel injectors, which may be direct injectors and/or port injectors. In a fuel system operating with direct injectors, a fuel lift pump supplies fuel to a high pressure fuel pump that in turn provides fuel at a high injection pressure to a fuel rail. The fuel rail is coupled to direct injectors that inject the fuel directly into combustion chambers of the engine. In a fuel system operating with port fuel injection, a fuel lift pump supplies fuel at a lower injection pressure to a fuel rail. The fuel rail is coupled to the port injectors, which inject the fuel into the engine intake upstream of intake ports of the combustion chambers. In a port fuel direct injection fuel system, both port injection and direct injection of fuel is performed.

Regardless of the fuel system type, the fuel lift pump can be controlled to output fuel at a substantially constant delivery pressure during what is referred to herein as continuous pump operation or operation in the continuous mode, via application of voltage at a duty cycle of 100% with a voltage level corresponding to the desired constant delivery pressure. When fuel flow demand changes, the voltage level may be adjusted to a different level and held constant or substantially constant at the different voltage level (at a duty cycle of 100%), resulting in a different substantially constant lift pump speed and delivery pressure. In contrast, the fuel lift pump can also be controlled to output intermittent pulses of relatively high pressure in what is referred to herein as pulsed pump operation or operation in the pulsed mode, in which the duty cycle of the voltage applied to the lift pump is less than 100%. During pulsed pump operation, the level of the voltage applied to the lift pump may alternate between a first, higher level and a second, lower level, where the second, lower level is very low (e.g., slightly above 0 V). During application of the first, higher level of voltage to the lift pump, the speed of the lift pump is high and thus the delivery pressure of the lift pump is high, whereas during application of the second, lower level of voltage to the lift pump, pump speed of the lift pump is very low (e.g., at a level slightly above zero, as it may be desirable to maintain supply of voltage to the lift pump rather than intermittently provide zero voltage) and the delivery pressure of the lift pump is very low. As a result, the delivery pressure of the lift pump over time during pulsed mode operation resembles a sawtooth wave, where the duration of time between a trough of the wave and an adjacent peak of the wave following the trough is proportional to a duration of application of voltage at the first, higher level, and where the duration of time between a peak of the wave and an adjacent trough of the wave following the peak is proportional to a duration of application of voltage at the second, lower level.

In contrast to continuous pump operation, pulsed pump operation, in which the fuel lift pump is energized only during the duration of each pulse, is more energy efficient. Further, when pulsed pump operation is performed rather than continuous pump operation, durability of the fuel lift pump may be extended, and maintenance costs of the fuel lift pump may be decreased.

When pulsed pump operation is performed, the controller of the engine may perform either open-loop control or closed-loop control of the pump. When open-loop control is performed, voltage pulses having a predetermined pulse width (and thus, a predetermined duty cycle) may be applied to the lift pump, and measured or inferred pressure downstream of the fuel lift pump (referred to herein as the delivery pressure of the lift pump) does not influence the control. In contrast, when closed-loop control is performed, the delivery pressure is fed back to the controller and influences the duration of subsequent high voltage pulses applied to the lift pump (as well as the duration of the intervals between the high voltage pulses when a voltage slightly above 0 V is applied). In examples where the delivery pressure is measured by a pressure sensor that provides feedback to the controller, degradation of the pressure sensor may shift the reading of the pressure sensor and thereby cause the delivery pressure to deviate from a desired or expected pressure, which may in turn degrade engine operation. As one example, errors within the expected range of sensor output (referred to as in-range errors) are much more difficult to detect than errors outside of the expected range of sensor output (referred to as out-of-range errors). In-range error detection is especially critical when the sensor provides feedback for closed-loop control of pulsed pump operation, as the error will result in incorrect adjustment of the voltage pulses applied to the lift pump.

One approach for addressing fuel pressure sensor in-range error detection is disclosed by Stavnheim et al. in U.S. Pat. No. 6,526,948 B1, which is concerned with diagnosing fuel pressure sensors that are "stuck" in-range. Therein, a controller samples a fuel pressure sensor signal, including pressure peaks and valleys, a number of times. The controller then computes an average pressure value and compares the measured values to the average. If a measured value is within a threshold of the average value, it indicates that the pressure sensor is stuck in-range (that is, not dynamically responding to changes in fuel pressure), and the controller logs an error code. At a certain number of logged errors, the controller initiates a minimum fueling algorithm that supplies just enough fuel to allow the vehicle to be driven out of danger or to a service center.

However, the inventors herein have recognized potential issues with this approach. As one example, the method described above is limited to identifying a degraded pressure sensor that does not respond to pressure fluctuations. However, a degraded pressure sensor may read higher or lower than the actual pressure but still respond to pressure fluctuations. Further, by providing just enough fuel for the vehicle to be driven out of danger or to a service center upon identification of pressure sensor degradation, desired vehicle operation may be unavailable when the pressure sensor is degraded, which may have a negative impact on driver satisfaction.

To address these issues, the inventors herein have identified methods and systems for diagnosing in-range pressure sensor errors and adjusting fuel system operation based on the diagnosis. In one example, the issues described above may be addressed by a method of operating an engine fuel system which comprises, during pulsed mode operation of a lift pump, adjusting a level of voltage applied to the lift pump based on an output signal of a pressure sensor downstream of the lift pump and monitoring the output signal for flattening; and, in response to a detection of flattening, indicating a pressure sensor error and operating the lift pump independent of the output signal of the pressure sensor. In this way, errors occurring within the normal operating range of a pressure sensor arranged downstream of a fuel lift pump can be detected, and fuel lift pump control can be switched from closed-loop to open-loop control upon detection of such errors. While open-loop lift pump control may be less fuel efficient than closed-loop lift pump control, it may not have a substantial impact on drivability.

In order to assure accuracy of the control of the lift pump as well as the in-range pressure sensor error diagnosis, the method may further include dynamically learning a setpoint pressure of a pressure relief valve and a fuel vapor pressure of the fuel system. This may include, during steady state engine operation with a requested delivery pressure of a fuel lift pump below a first threshold, decreasing a duty cycle of voltage pulses applied to a fuel lift pump until flattening of an output signal of a pressure sensor downstream of the lift pump is detected, and storing the pressure at which the output signal flattened as a fuel vapor pressure of the fuel system; during steady state engine operation with a requested delivery pressure of the fuel lift pump above a second threshold, increasing a duty cycle of voltage pulses applied to the lift pump until flattening of the output signal of the pressure sensor is detected, storing the pressure at which the output signal flattened as a setpoint pressure of a pressure relief valve; and adjusting lift pump operation based on the stored setpoint pressure and fuel vapor pressure. Dynamically learning the expected physical maximum and minimum values of the fuel system in this way may improve overall accuracy of the control of the fuel lift pump, and in turn improve the accuracy of pressure sensor error diagnoses.

In yet another example in accordance with the present disclosure, the lift pump may be controlled via a robust closed-loop control strategy. This may include, during pulsed operation of a lift pump, turning the lift pump OFF when a sensed delivery pressure increases to a desired peak pressure or an ON time of the lift pump reaches a calibrated maximum, and turning the lift pump ON when either the sensed delivery pressure decreases to a desired trough pressure or a volume of fuel ingested by the engine reaches a predetermined volume. Such operation may advantageously reduce the possibility of the lift pump becoming "stuck" at a pressure below the setpoint pressure when the lift pump is ON due to the sensor reading low, or at a pressure above the fuel vapor pressure when the lift pump is OFF due to the sensor reading high. Optionally, the robust control strategy may also include calibrating sensor output after detecting that the ON time of the lift pump has reached a calibrated maximum or the volume of fuel ingested by the engine has reached a predetermined volume, so that accurate lift pump control may be performed even when the sensor is degraded.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 3A-3E show graphs illustrating the sensed delivery pressure of a fuel lift pump as a function of time during pulsed pump operation of the fuel lift pump.

In FIGS. 12A-12B, the sensor is reading low, whereas in FIGS. 12C-12D, the sensor is reading high.

DETAILED DESCRIPTION

Figure 1:
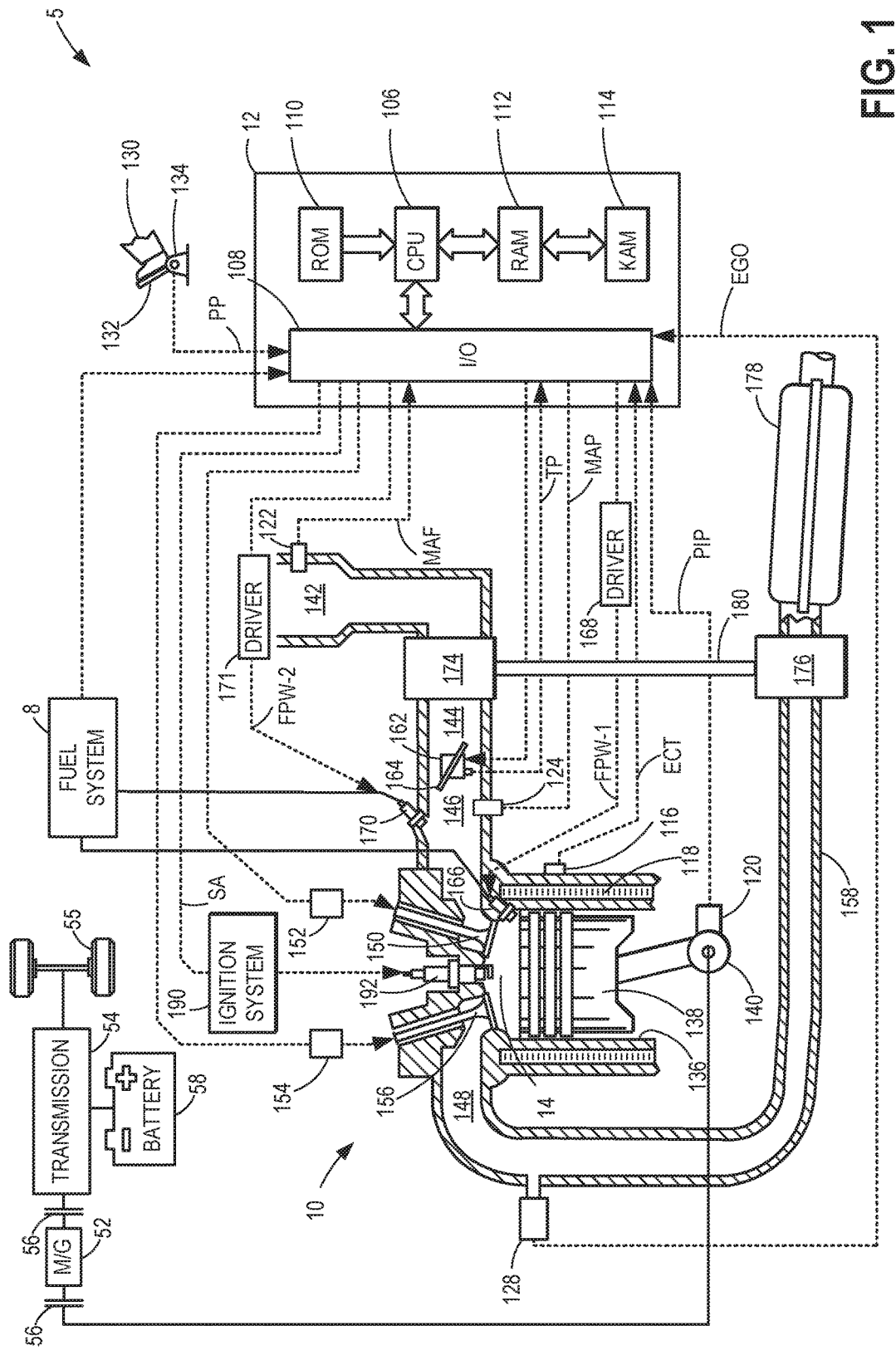
FIG. 1 schematically shows an example embodiment of a cylinder in an internal combustion engine of a vehicle.
Figure 2:
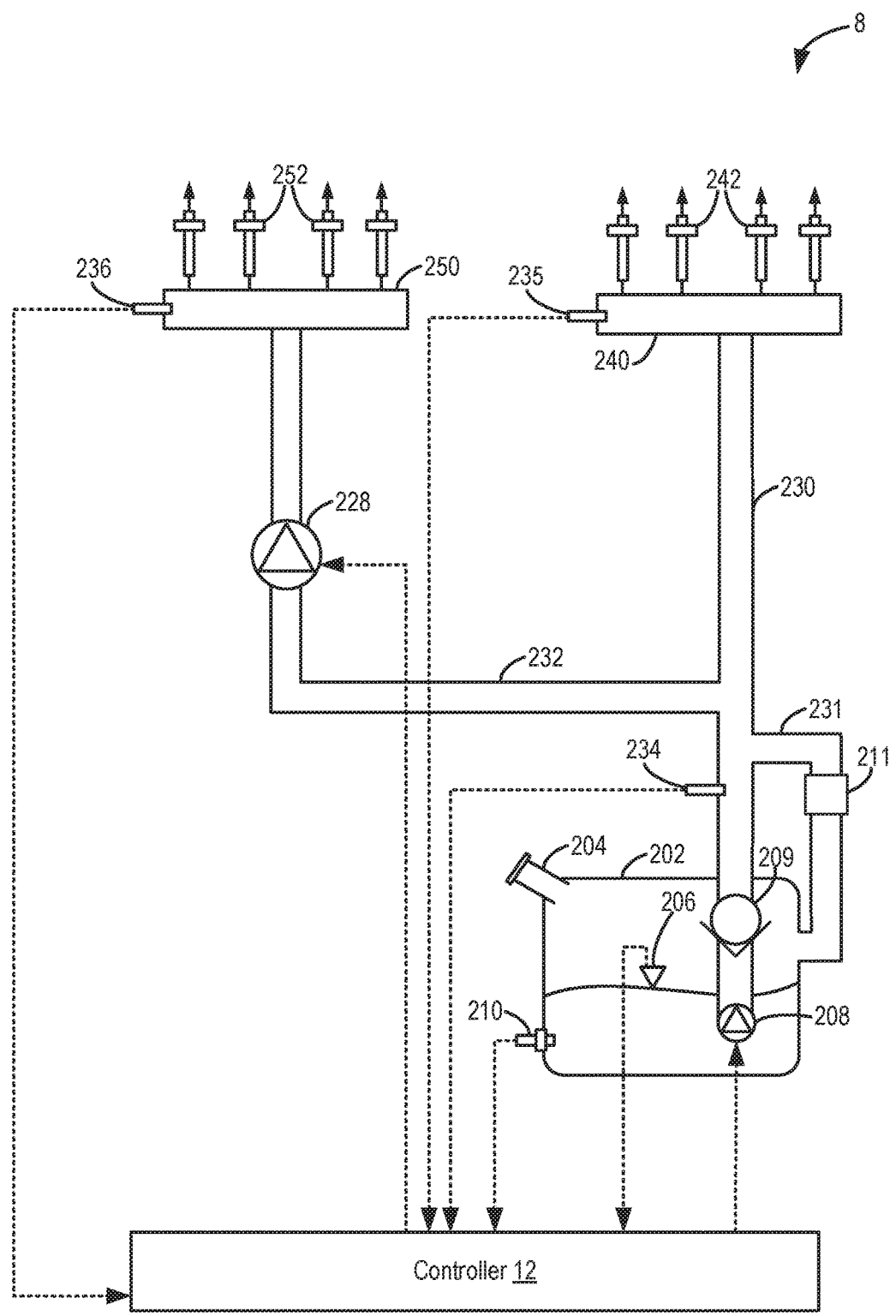
FIG. 2 schematically shows an example embodiment of a fuel system that may be used in the engine of FIG. 1.
Figure 3B:
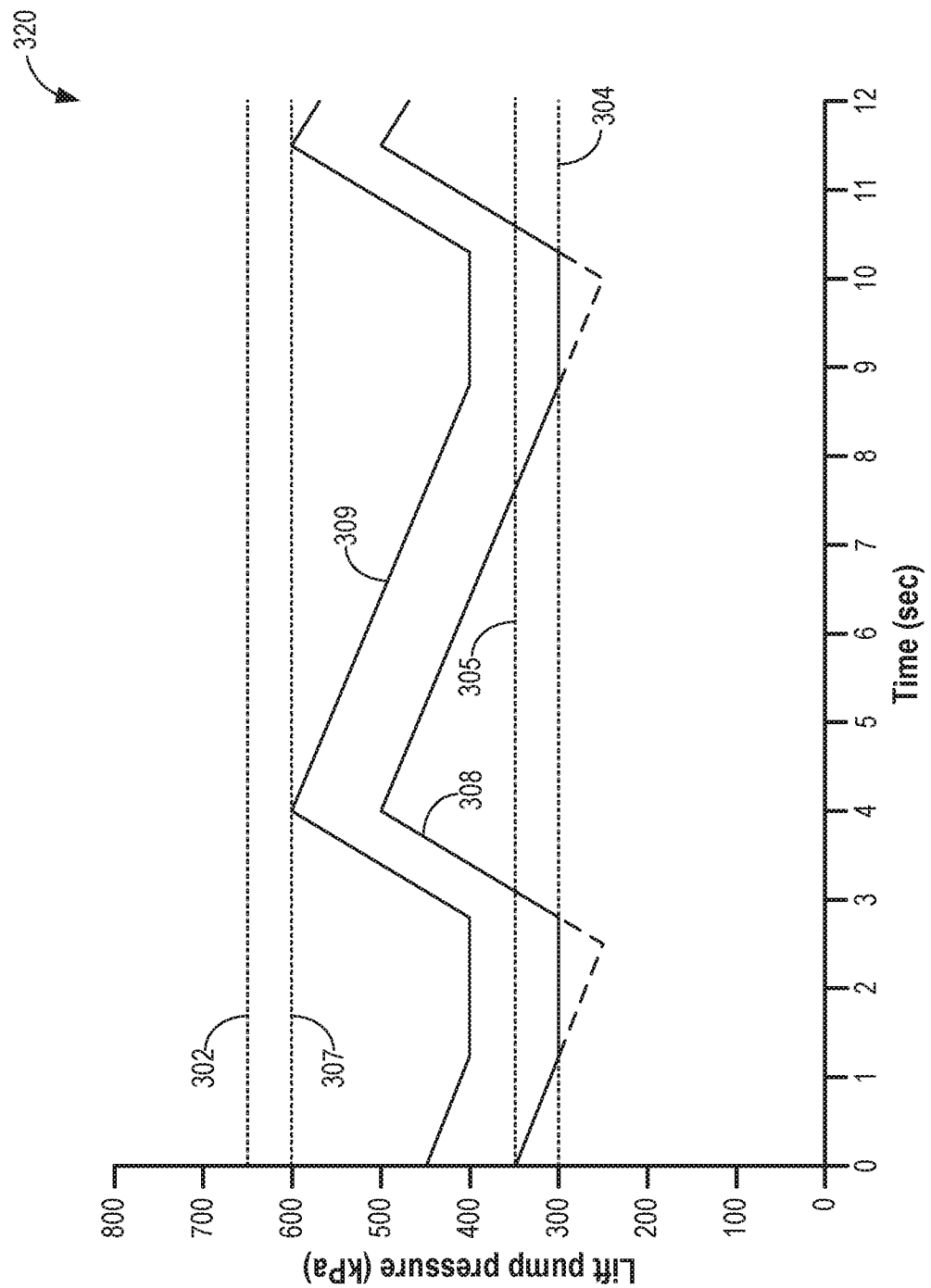
Figure 3C:
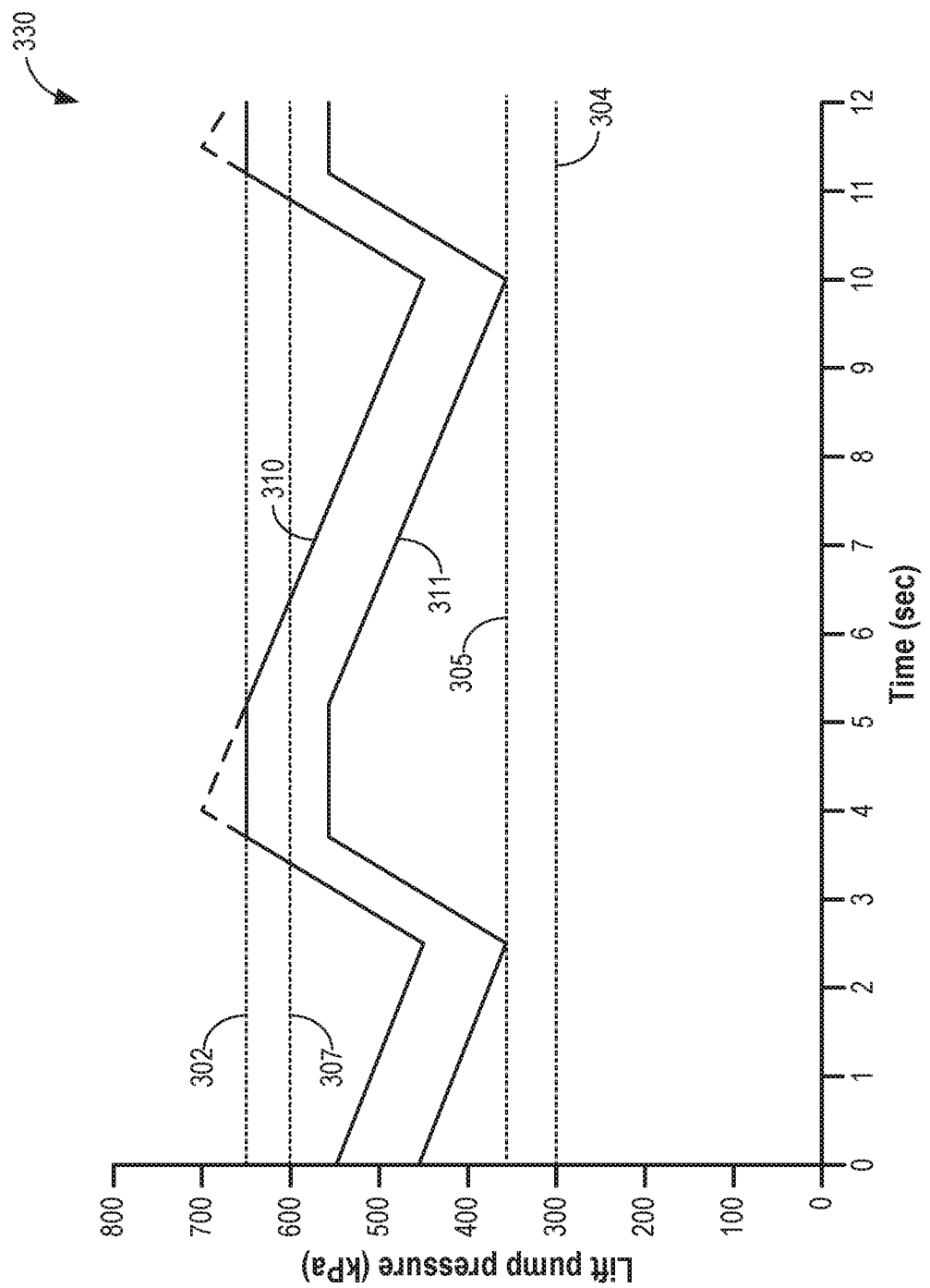
Figure 4:
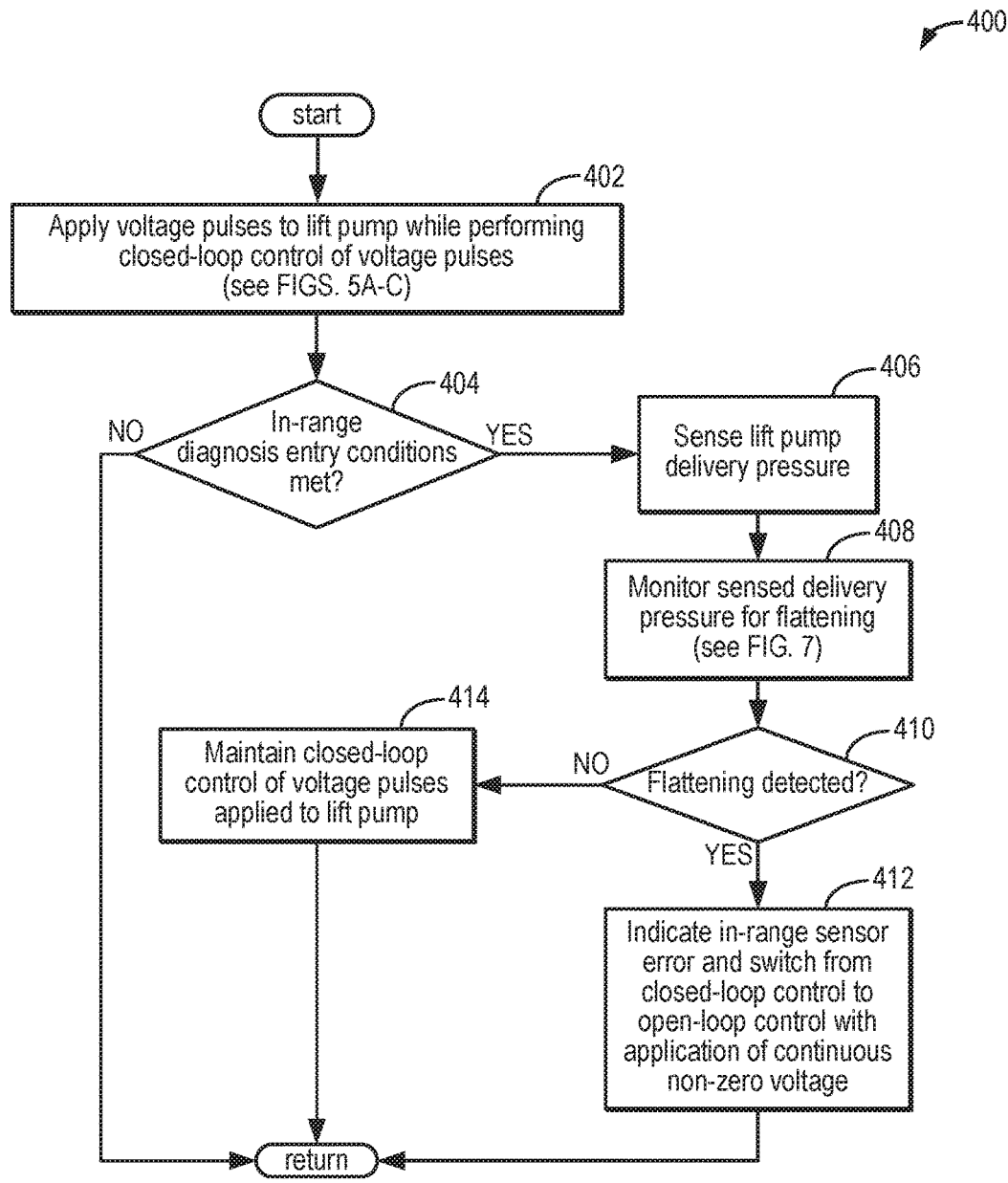
FIG. 4 shows a flow chart illustrating a routine for diagnosing an in-range error of a pressure sensor downstream of a fuel lift pump and controlling operation of the fuel lift pump in response to the diagnosis.

The following description relates to systems and methods for controlling a fuel lift pump in a fuel system of an engine, such as the engine shown in FIG. 1, as well as diagnosing an in-range error of a pressure sensor arranged downstream of the fuel lift pump and adjusting operation of the fuel system in response to the diagnosis. As shown in FIG. 2, the fuel system may include both port fuel injectors and direct fuel injectors and associated fuel rails. However, the methods and systems described herein are equally applicable to fuel systems which include port injectors and do not include direct injectors, and fuel systems which include direct injectors and do not include port injectors, as well as fuel systems including other types of fuel injectors which receive pressurized fuel from a fuel lift pump. The lift pump can be operated in a pulsed mode with closed-loop feedback control (e.g., in accordance with the routine shown in FIGS. 5A-5C) in which pulses of voltage are supplied to the lift pump until a desired fuel pressure is reached, as measured by a pressure sensor downstream of the lift pump. Further, a setpoint pressure of a pressure relief valve of the fuel system and a fuel vapor pressure within the fuel system may be dynamically leaned at a controller of the engine by monitoring the sensed pressure downstream of the lift pump while adjusting the voltage applied to the lift pump (e.g., adjusting the duty cycle of voltage pulses applied to the lift pump), in accordance with the routine shown in FIG. 6 and the map shown in FIG. 8. During the application of voltage pulses to the lift pump, the output signal of the pressure sensor downstream of the lift pump may have a sawtooth waveform, an example of which is shown in FIG. 3A. However, during an in-range error of the pressure sensor, the sawtooth waveform may flatten at its peaks or troughs depending on the nature of the in-range error, as shown in FIGS. 3B-3C. As shown in FIG. 4, the controller may perform a routine in which the output signal of the pressure sensor downstream of the lift pump is monitored for flattening (e.g., in accordance with the routine shown in FIG. 7) during pulsed pump operation with closed-loop control. In response to a detection of flattening, an in-range error of the pressure sensor may be indicated, and the controller may switch from closed-loop pump operation (in which pressure sensor feedback factors into the control of the lift pump) to open-loop pump operation (in which pressure sensor feedback does not factor into the control of the lift pump), in accordance with the maps shown in FIGS. 9 and 10. Alternatively, the lift pump may be operated in accordance with the robust closed-loop control strategy shown in the routine of FIG. 11. This strategy may include turning the lift pump OFF when it has been ON for a calibrated maximum ON time, even if the pressure sensor output has not reached a desired peak pressure, and turning the lift pump ON when a volume of fuel ingested since the lift pump was OFF reaches a predetermined volume, even if the pressure sensor output has not reached a desired trough pressure, as shown in FIGS. 12A-12D. Optionally, as shown in FIGS. 12B and 12D, pressure sensor output may be calibrated when it has been determined that the sensor is reading high or low, and the calibrated pressure sensor output may be substituted for the pressure sensor output in the feedback control of the lift pump.

Regarding terminology used throughout this detailed description, port fuel injection may be abbreviated as PFI while direct injection may be abbreviated as DI. A high pressure pump may be abbreviated as a HP pump (alternatively, HPP) or a DI fuel pump. Similarly, a lift pump or fuel lift pump may also be referred to as a low pressure pump (abbreviated as LP pump or LPP). Also, fuel rail pressure, or the value of pressure of fuel within a fuel rail, may be abbreviated as FRP. The direct injection fuel rail may also be referred to as a high pressure fuel rail, which may be abbreviated as HP fuel rail. For the sake of brevity, the pressure relief valve setpoint pressure will be referred to herein as the setpoint pressure.

FIG. 1 depicts an example of a combustion chamber or cylinder of internal combustion engine 10, which may be included in a motor vehicle 5. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder 14 (herein also termed combustion chamber 14) of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system (not shown). Further, a starter motor (not shown) may be coupled to crankshaft 140 via a flywheel (not shown) to enable a starting operation of engine 10.

Cylinder 14 can receive intake air via a series of intake air passages 142, 144, and 146. Intake air passages 142, 144, and 146 can communicate with other cylinders of engine 10 in addition to cylinder 14. In some examples, one or more of the intake passages may include a boosting device such as a turbocharger or a supercharger. For example, FIG. 1 shows engine 10 configured with a turbocharger including a compressor 174 arranged between intake air passages 142 and 144, and an exhaust turbine 176 arranged along exhaust passage 158. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be positioned downstream of compressor 174 as shown in FIG. 1, or alternatively may be provided upstream of compressor 174.

Exhaust manifold 148 can receive exhaust gases from other cylinders of engine 10 in addition to cylinder 14. Exhaust gas sensor 128 is shown coupled to exhaust passage 158 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT), and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other examples, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. In one example, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some examples, each cylinder of engine 10 may be configured with one or more fuel injectors for providing fuel thereto. As a non-limiting example, cylinder 14 is shown including two fuel injectors 166 and 170. Fuel injectors 166 and 170 may be configured to deliver fuel received from fuel system 8. As elaborated below with reference to FIG. 2, fuel system 8 may include one or more fuel tanks, fuel pumps, and fuel rails.

Fuel injector 166 is shown coupled directly to cylinder 14 for injecting fuel directly therein in proportion to the pulse width of signal FPW-1 received from controller 12 via electronic driver 168. In this manner, fuel injector 166 provides direct injection of fuel into combustion cylinder 14. While FIG. 1 shows injector 166 positioned to one side of cylinder 14, it may alternatively be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a fuel tank of fuel system 8 via a lift pump and/or a high pressure fuel pump and a fuel rail. Further, the fuel tank may have a pressure transducer providing a signal to controller 12.

Fuel injector 170 is shown arranged in intake air passage 146, rather than in cylinder 14, in a configuration that provides port injection of fuel into the intake port upstream of cylinder 14. Fuel injector 170 may inject fuel, received from fuel system 8, in proportion to the pulse width of signal FPW-2 received from controller 12 via electronic driver 171. Note that a single electronic driver 168 or 171 may be used for both fuel injection systems, or multiple drivers, for example electronic driver 168 for fuel injector 166 and electronic driver 171 for fuel injector 170, may be used, as depicted.

In an alternate example, each of fuel injectors 166 and 170 may be configured as direct fuel injectors for injecting fuel directly into cylinder 14. In still another example, each of fuel injectors 166 and 170 may be configured as port fuel injectors for injecting fuel upstream of intake valve 150. In yet other examples, cylinder 14 may include only a single fuel injector that is configured to receive different fuels from the fuel systems in varying relative amounts as a fuel mixture, and is further configured to inject this fuel mixture either directly into the cylinder as a direct fuel injector or upstream of the intake valves as a port fuel injector. As such, it should be appreciated that the fuel systems described herein should not be limited by the particular fuel injector configurations described herein by way of example.

Fuel may be delivered by both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions, such as engine load, knock, and exhaust temperature, such as described herein below. The port injected fuel may be delivered during an open intake valve event, closed intake valve event (e.g., substantially before the intake stroke), as well as during both open and closed intake valve operation. Similarly, directly injected fuel may be delivered during an intake stroke, as well as partly during a previous exhaust stroke, during the intake stroke, and partly during the compression stroke, for example. As such, even for a single combustion event, injected fuel may be injected at different timings from the port and direct injector. Furthermore, for a single combustion event, multiple injections of the delivered fuel may be performed per cycle. The multiple injections may be performed during the compression stroke, intake stroke, or any appropriate combination thereof.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved.

Controller 12 is shown in FIG. 1 as a microcomputer, including microprocessor unit 106, input/output ports 108, an electronic storage medium for executable programs and calibration values shown as non-transitory read only memory chip 110 in this particular example for storing executable instructions, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. The MAP signal may be used to provide an indication of vacuum, or pressure, in the intake manifold. An engine speed signal, RPM, may be generated by controller 12 from the signal PIP.

In some examples, vehicle 5 may be a hybrid vehicle with multiple sources of torque available to one or more vehicle wheels 55. In other examples, vehicle 5 is a conventional vehicle with only an engine, or an electric vehicle with only electric machine(s). In the example shown, vehicle 5 includes engine 10 and an electric machine 52. Electric machine 52 may be a motor or a motor/generator. Crankshaft 140 of engine 10 and electric machine 52 are connected via a transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 55. Electric machine 52 may also be operated as a generator to provide electrical power to charge battery 58, for example during a braking operation.

FIG. 2 schematically depicts an exemplary embodiment of fuel system 8 of FIG. 1. Actuators of fuel system 8 may be operated by a controller, such as controller 12 of FIG. 1, to perform some or all of the operations described with reference to the example routines depicted in FIGS. 4-7.

Fuel system 8 can provide fuel to an engine, such as example engine 10 of FIG. 1, from a fuel tank 202. In the depicted embodiment, the fuel system is a PFDI fuel system and thus includes a first low-pressure fuel rail 240 which dispenses fuel to one or more port injectors 242 and a second high-pressure fuel rail 250 which dispenses fuel to one or more direct injectors 252. In other examples, however, fuel system 8 may be a PFI or DI fuel system. By way of example, the fuel may include one or more hydrocarbon components, and may also optionally include an alcohol component. The fuel may be provided to fuel tank 202 via fuel filling passage 204.

A fuel lift pump (LPP) 208 in communication with fuel tank 202 may be operated to supply fuel from fuel tank 202 to a first fuel passage 230. As shown, first fuel passage 230 has a first end coupled to the output of the lift pump and a second end coupled to the first fuel rail, such that fuel pumped into the first fuel passage by the LPP may be supplied to the first fuel rail 240 and thus to port injectors 242. In one example, LPP 208 may be electrically-powered and disposed at least partially within fuel tank 202. As shown, a check valve 209 may be positioned downstream of an outlet of LPP 208. Check valve 209 may enable fuel flow from LPP 208 to first fuel passage 230, while blocking fuel flow in the opposite direction from first fuel passage 230 back to LPP 208. The pressure downstream of check valve 209 may differ from the pressure downstream of LPP 208 and upstream of check valve 209; references to the pressure in the first fuel passage herein refer to the pressure in the first fuel passage downstream of check valve 209.

A pressure relief valve 211 may be included in the fuel system to bleed off excess pressure. In the depicted example, pressure relief valve 211 is arranged in a passage 231 which has a first end coupled to first fuel passage 230 and a second end coupled to fuel tank 202, to allow fuel to flow from first fuel passage 230 back to fuel tank 202 in the event that the pressure of the fuel system exceeds a setpoint pressure of the pressure relief valve. The pressure relief valve may a passive valve which opens and closes depending on a fluid pressure it is exposed to; alternatively, the pressure relief valve may be an actively controlled valve, and the controller may send a signal to an actuator of the pressure relief valve to open or close the valve depending on a fluid pressure such as the delivery pressure of the fuel system. The setpoint pressure is the pressure at which the pressure relief valve passively opens (or is actively opened) to bleed pressure from the fuel system (e.g., by returning fuel to the fuel tank). The value of the setpoint pressure may be fixed by the geometry of the pressure relief valve, or may be varied by an actuator of the pressure relief valve in response to a signal from the controller.

While first fuel rail 240 is shown dispensing fuel to four port injectors 242, it will be appreciated that first fuel rail 240 may dispense fuel to any suitable number of fuel injectors. As one example, first fuel rail 240 may dispense fuel to one of port injectors 242 for each cylinder of the engine. In other examples, first fuel passage 230 may provide fuel to port injectors 242 via two or more first fuel rails. For example, where the engine cylinders are configured in a V-type configuration, the first fuel passage may lead to two first fuel rails, each of which may dispense fuel to respective port injectors.

In the depicted example, a second fuel passage 232 branches from the first fuel passage upstream of the first fuel rail. A first end of the second fuel passage is coupled to the first fuel passage upstream of the first fuel rail, while a second end of the second fuel passage is coupled to the second fuel rail. A direct injection fuel pump (HPP) 228, which receives fuel pumped from the fuel tank by LPP 208, is arranged in second fuel passage 232. In one example, HPP 228 may be a mechanically-powered positive-displacement pump. HPP 228 may be in communication with direct injectors 252 via second fuel rail 250. Fuel pumped by LPP 208 into first fuel passage 230 may be pumped from first fuel passage 230 into second fuel passage 232 by HPP 228, and further pressurized by HPP pump 228, before flowing to second fuel rail 250 for injection directly into the engine via direct injectors 252. Second fuel rail 250 may be a high pressure fuel rail; for example, fuel may be stored in second fuel rail 250 at a pressure higher than the pressure of the fuel stored first fuel rail 240, due to the further pressurization of the fuel occurring at HPP 228.

The various components of fuel system 8 communicate with an engine control system, such as controller 12. For example, controller 12 may receive signals indicating operating conditions from various sensors associated with fuel system 8 in addition to the sensors previously described with reference to FIG. 1. The signals may include signal from one or more pressure sensors arranged in the fuel system such as pressure sensors 234, 235, and 236. The signals may further include a signal from a fuel level sensor 206 indicating an amount of fuel stored in fuel tank 202. Controller 12 may also receive signals indicating fuel composition from one or more fuel composition sensors in addition to, or alternative to, an indication of a fuel composition that is inferred based on a signal from an exhaust gas sensor (such as sensor 128 of FIG. 1). For example, an indication of fuel composition of fuel stored in fuel tank 202 may be provided by fuel composition sensor 210. Fuel composition sensor 210 may further comprise a fuel temperature sensor. Additionally or alternatively, one or more fuel composition sensors may be provided at any suitable location along the fuel passages between the fuel storage tank and the fuel injectors.

In the example shown in FIG. 2, the fuel system comprises a pressure sensor 236 coupled to second fuel rail 250, and one or more of a pressure sensor 234 coupled to first fuel passage 230 and a pressure sensor 235 coupled to first fuel rail 240. Pressure sensor 234 may be used to determine a fuel line pressure of first fuel passage 230 downstream of the lift pump, and thus the delivery pressure of the lift pump. Pressure sensor 235 may be used for measuring the pressure level within first fuel rail 240. Pressure sensor 236 may be used for measuring the pressure level in second fuel rail 250. The locations of the pressure sensors shown in FIG. 2 are for exemplary purposes only and are non-limiting; instead of or in addition to the depicted pressure sensors, other pressure sensors may be positioned in fuel system 8 to measure the pressure at different locations therein. The various sensed pressures may be communicated as signals to controller 12. In some examples, other types of sensors may be arranged at various locations in fuel system 8, and pressures within the fuel system may be inferred based on the output of these sensors.

As used herein, the term "delivery pressure" refers to fuel pressure downstream of the lift pump, specifically, downstream of the check valve 209 in the example fuel system of FIG. 2, and upstream of any DI pump or other type of pump that may be included in the system. In an example where the fuel system includes a pressure sensor in the first fuel passage (e.g., pressure sensor 234) and does not include a pressure sensor in the first fuel rail, the delivery pressure refers to the pressure measured in the first fuel passage. In an example where the fuel system includes a pressure sensor in the first fuel rail (e.g., pressure sensor 235) but does not include a pressure sensor in the first fuel passage, the delivery pressure refers to the pressure in the first fuel rail. In an example where the fuel system includes a pressure sensor in both the first fuel passage and the first fuel rail, the delivery pressure may refer to only one of the pressure in the first fuel passage and the pressure in the first fuel rail.

Controller 12 is configured to control the operation of each of LPP 208 and HPP 228 to adjust an amount, pressure, flow rate, etc., of fuel delivered to the engine. As one example, controller 12 may vary a pressure setting, a pump stroke amount, a pump duty cycle command, and/or fuel flow rate of the fuel pumps to deliver fuel to different locations of the fuel system. During both port injection and direct injection, LPP 208 may be controlled by controller 12 to supply fuel to first fuel rail 240 and/or HPP 228 based on the pressure in one or more of the first fuel passage, the first fuel rail, and the second fuel rail. A driver electronically coupled to controller 12 may be used to send a control signal to an actuator of LPP 208 to adjust the output (e.g., speed and/or delivery pressure) of LPP 208. During direct injection, the amount of fuel that is delivered to the direct injectors via HPP 228 may be adjusted by adjusting and coordinating the output of LPP 208 and HPP 228.

Controller 12 may control LPP 208 to operate in a continuous mode or a pulsed mode. Similarly, controller 12 may control HPP 228 to operate in a continuous mode or a pulsed mode. During operation of LPP 208 in the continuous mode, a constant non-zero voltage is applied to the lift pump to supply fuel at a constant fuel pressure to first fuel rail 240. Continuous mode operation of HPP 228 may be carried out in a similar manner. On the other hand, during operation of LPP 208 in the pulsed mode, the LPP may be activated (e.g., turned ON) but provided with zero voltage or a voltage slightly greater than zero. Pulses of higher voltage may then be supplied to LPP 208. During application of each higher voltage pulse, the voltage supplied to the LPP is increased from a lower positive voltage (e.g., 0 V or substantially 0 V) to a higher positive voltage (e.g., 8-12 V), held at the higher voltage for a duration (e.g., 30-300 ms), and then decreased from the higher voltage back to the lower voltage.

In accordance with a first exemplary feedback control strategy, a duty cycle of the voltage pulses is fixed. The duty cycle of the voltage pulses determines the relative duration of application of the lower voltage and the higher voltage to the lift pump (and thus, the pulse width of the pulses). In such cases, a higher voltage to be supplied to the lift pump may be selected based on the fixed duty cycle (which dictates the duration of the higher voltage pulses). For example, LPP 208 may be pulsed at 8 V when the interval between the higher voltage pulses (during which the lower voltage is supplied) is between 0 and 50 milliseconds. Alternatively, when the interval between the higher voltage pulses is between 50 and 100 milliseconds, LPP 208 may be pulsed at 10 V. In another example, LPP 208 may be pulsed at 12 V when the interval between the higher voltage pulses is between 100 and 250 milliseconds.

In contrast, in a second exemplary feedback control strategy, the LPP is turned ON (e.g., operated at a high voltage) when it is sensed that a desired trough delivery pressure has been reached, and turned OFF (e.g., operated at a voltage near 0 V) when it is sensed that a desired peak delivery pressure has been reached.

Operating the LPP in the pulsed mode may effectively ensure lower energy consumption by the LPP while providing a faster response time when the LPP is actuated. Further, operation in the pulsed mode may improve durability of LPP 208. Pulsed mode operation of HPP 228 may be carried out in a similar manner.

A Pump Electronics Module (PEM) of LPP 208 may supply electrical power to an electric motor coupled to the LPP. In one example, a controller such as controller 12 of FIG. 1 reads the output of a fuel pressure sensor sensing the delivery pressure of the LPP, and issues a Fuel Pump Command (FPC) to the PEM which varies with and is determined based on the output of the fuel pressure sensor, among other factors. The FPC may be encoded as a 150 Hz duty cycle, for example, which communicates the intended duty cycle of a Field Effect Transistor (FET) of the LPP to the PEM. Alternatively, the PEM may communicate the FPC via serial interface such as a CAN bus or LIN bus. The PEM takes the commanded FET duty cycle and duty cycles the FET at a frequency such as 9.8 kHz. This causes an effective voltage to be applied to the pump's brushed DC motor. Thus, if the vehicle voltage supply is at 12 V and the desired effective voltage to be applied to the LPP is at 6 V, the FET may be turned on for 0.00005 seconds and off for 0.00005 seconds (thus, operated at a 50% duty cycle). The PEM current has a certain value; the pump motor current is generally a current that is on average greater than the average current of the PEM due to the circulation of current through a diode while the FET is off. (Instantaneous PEM current is substantially equal to pump motor instantaneous current while the FET is on. While the FET is off, PEM instantaneous current is zero but the current through the motor's inductance is some positive value.) The PEM sources its electrical energy from the vehicle battery, which may be a 12 V battery, as well as the alternator system of the vehicle. If no "current shaping" or "soft start" actions are taken, the PEM current peaks at 30 to 35 amps, for example. However, by not instantly applying a full step voltage of full battery/alternator voltage, the peak value of this in-rush current may be reduced, e.g. to the level of steady state current. For example, the effective pump motor applied voltage may be shaped such that the in-rush current spike remains less than 10 amps.

When operating LPP 208 in the pulsed mode, a sawtooth pressure pattern may be observed in the delivery pressure, as will be discussed in further detail with reference to FIGS. 3A-3C. For example, the pulsed mode may generate a quick rise in pressure to 6.5 bar followed by a ramp down to 4.5 bar as fuel is consumed. While this change in pressure may not be used in direct injection systems, knowledge of current pressure may be desired in PFI systems.

In the continuous mode of operation, control of the LPP (e.g., control of the level of voltage applied to the LPP) may be closed-loop control based on feedback from one or more pressure sensors (e.g., pressure sensors 234, 235, and 236) or open-loop control which is performed independent of, and does not take into account, pressure sensor feedback. Similarly, in the pulsed mode of operation, control of the LPP (e.g., control of the voltage level and/or duty cycle of the pulses applied to the LPP) may be closed-loop control based on feedback from one or more pressure sensors (e.g., pressure sensors 234, 235, and 236) or open-loop control which is performed independent of, and does not take into account, pressure sensor feedback. When the pulsing of LPP 208 is performed independent of feedback, the LPP may be operated with slightly higher power than required. However, despite the slightly higher power provided to LPP 208 during pulsed mode operation without feedback, the LPP may effectively consume significantly lower power in the pulsed mode without feedback as compared to power consumption during continuous mode operation of the lift pump.

FIGS. 1-2 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Figure 3E:
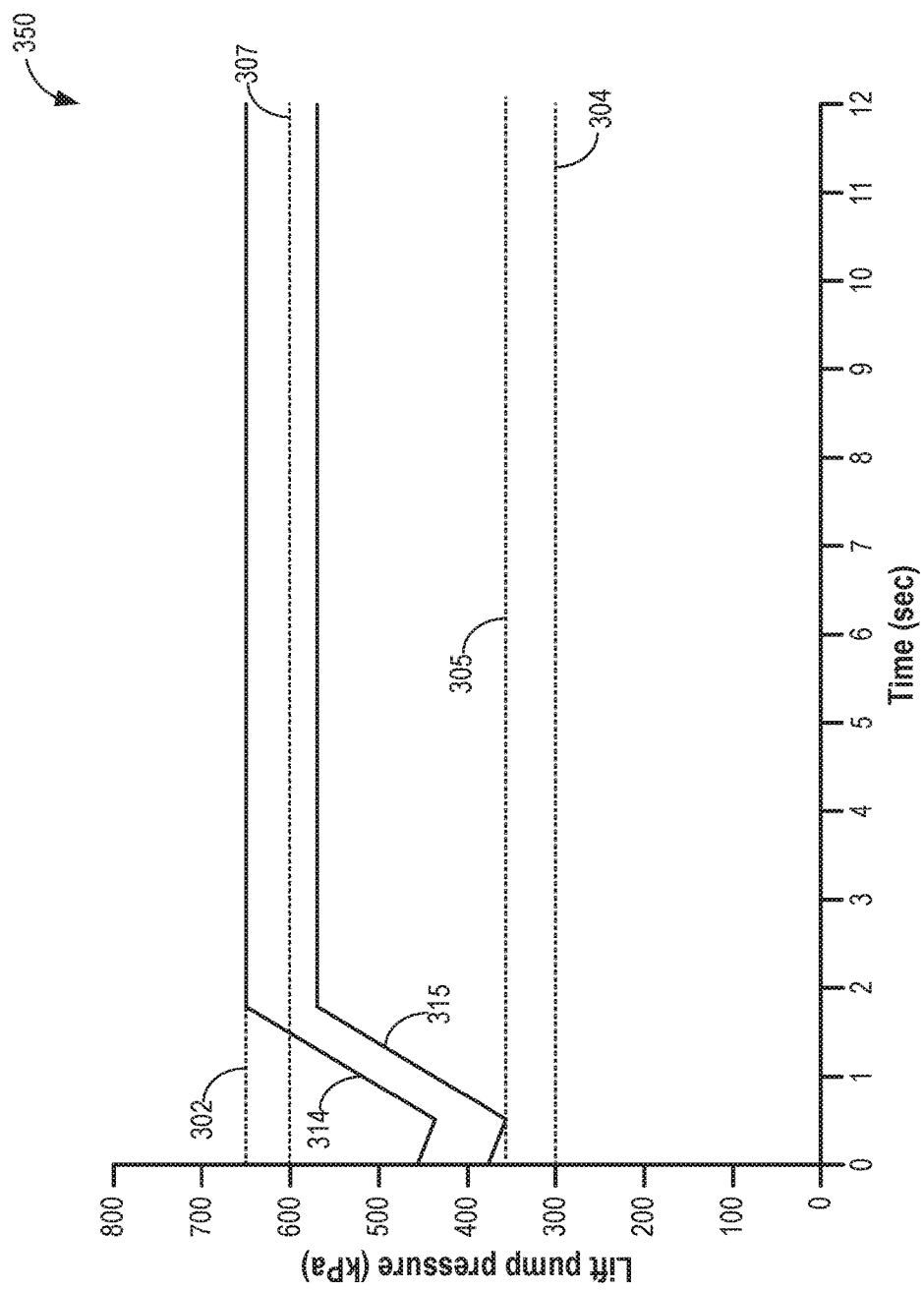

FIGS. 3A-3E depict graphs illustrating the sensed and actual delivery pressures of a fuel lift pump (e.g., LPP 208 of FIG. 2) during pulsed operation, as a function of time. FIG. 3A illustrates a waveform that represents both the sensed and actual delivery pressures during pulsed operation when a pressure sensor sensing the delivery pressure is functioning properly. FIG. 3B illustrates two waveforms representing the sensed and actual delivery pressures, respectively, during pulsed operation with the first exemplary feedback control strategy, when the pressure sensor sensing the delivery pressure is degraded and reading high. FIG. 3C illustrates two waveforms representing the sensed and actual delivery pressures, respectively, during pulsed operation with the first exemplary feedback control strategy, when the pressure sensor sensing the delivery pressure is degraded and reading low. FIG. 3D illustrates two waveforms representing the sensed and actual delivery pressures, respectively, during pulsed operation with the second exemplary feedback control strategy when the pressure sensor sensing the delivery pressure is degraded and reading high. FIG. 3E illustrates two waveforms representing the sensed and actual delivery pressures, respectively, during pulsed operation with the second exemplary feedback control strategy when the pressure sensor sensing the delivery pressure is degraded and reading low.

As shown in FIGS. 3A-3E, application of voltage pulses to a fuel lift pump results in delivery pressures that create a waveform with a sawtooth pattern when plotted over time. In some examples, during pulsed operation of the lift pump, in accordance with the first exemplary feedback control strategy, the duty cycle of the pulses applied to the lift pump (and optionally the level of the supply voltage) is selected (e.g., pre-programmed into the controller, dynamically learned at the controller, or determined at the controller based on engine operating conditions) such that application of each pulse of supply voltage to the lift pump generates a quick rise in the delivery pressure until a desired peak pressure is reached. In accordance with the second exemplary feedback control strategy, however, a predetermined high voltage is applied to the lift pump when it is sensed that a desired trough delivery pressure has been reached, whereas a predetermined low voltage (e.g., 0 V or slightly greater than 0 V) is applied to the lift pump when it is sensed that a desired peak delivery pressure has been reached, such that the sensed delivery pressure dictates the duration of each higher voltage pulse. It will be appreciated that other feedback control strategies may be used without departing from the scope of this disclosure.

In the examples shown in FIGS. 3A-3E, the desired peak pressure (represented by dashed line 307) was chosen to be below a setpoint pressure of the pressure relief valve (represented by dashed line 302), and the desired trough pressure (represented by dashed line 305) was chosen to be above the vapor pressure of the fuel (represented by dashed line 304). The setpoint pressure and the fuel vapor pressure may represent the physical maximum and minimum pressures of the fuel system, respectively. For example, as discussed above with reference to FIG. 2, the setpoint pressure is the pressure at which the pressure relief valve opens to bleed pressure from the fuel system (e.g., by returning fuel to the fuel tank). Further, the fuel exists in thermodynamic equilibrium between its gaseous and liquid phases, with the fuel vapor existing with a specific pressure (e.g., vapor pressure)

that depends on fuel composition and temperature. In the absence of additional fuel delivery by the lift pump, as fuel is injected by the fuel injectors, the delivery pressure decreases to the fuel vapor pressure and cannot decrease any further. The fuel vapor pressure may vary from near zero absolute pressure at cold ambient temperatures to 600+ kPa absolute pressure during hot restarts. The fuel vapor pressure is the minimum pressure that can be obtained in the fuel system as long as any liquid fuel exists in the system, which is always the case in real vehicles. Undissolved air may also exist in the line which makes the pressure slightly higher than the fuel vapor pressure, but the fuel vapor pressure still sets the minimum pressure.

Powering the lift pump motor results in the delivery pressure rising, such that the delivery pressure ends up appearing to be an upward ramp when plotted over time. When the lift pump motor is OFF and the voltage applied to the lift pump is substantially 0 V, and the fuel is being PFI injected out or DI pumped out of this low fuel pressure zone at a constant rate, the delivery pressure ends up appearing to be a downward ramp when plotted over time. If the fuel consumption (via PFI injections or DI pumping) increases, the downward ramp steepens and vice versa.

In the example graph 300 shown in FIG. 3A, feedback control of the lift pump is working properly, and the pressure sensor sensing the delivery pressure reads accurately (e.g., it is not degraded). As the pressure sensor is reading accurately, the signal output by the pressure sensor accurately represents the actual delivery pressure. Accordingly, waveform 306, which has a sawtooth pattern, represents both the signal output by the pressure sensor and the actual delivery pressure. As shown, waveform 306 has peaks 306a at a desired peak pressure (represented by dashed line 307), which is lower than the setpoint pressure 302 of the pressure relief valve (thereby providing a margin between the peak pressure and the setpoint pressure). Further, waveform 306 has troughs 306b at a pressure higher than fuel vapor pressure 304. In other examples, however, the desired peak pressure may be set equal to the setpoint pressure, and/or the duty cycle of the pulses may be set such that the troughs of the waveform are equal to the fuel vapor pressure.

In contrast, in the example graph 320 shown in FIG. 3B, the pressure sensor is degraded and reads high (represented by waveform 309) compared with the actual delivery pressure (represented by waveform 308). In this example, the first exemplary feedback control strategy is being performed. Accordingly, waveform 309 has the same shape as waveform 308 but is shifted upward in the graph, as the controller adjusts the voltage pulses applied to the lift pump in response to the (higher) sensed delivery pressure. Specifically, the controller has decreased the duty cycle of the voltage pulses applied to the lift pump to a lower value relative to the duty cycle that would have been selected with an accurate sensor reading. As a result, not enough voltage is supplied for the actual delivery pressure (waveform 308) to reach the desired peak pressure 307, and the actual delivery pressure decreases relative to the delivery pressure during nominal pressure sensor operation (e.g., as represented by waveform 306 of FIG. 3A). Further, in the depicted example, the actual delivery pressure has decreased to such an extent that after a voltage pulse is applied to the lift pump during fuel injection by fuel injectors, the pressure decreases to the fuel vapor pressure and remains at the fuel vapor pressure for a duration (e.g., until it begins increasing again due to application of the next voltage pulse), such that waveform 308 appears flattened at each trough. Trough flattening occurs because the actual pressure cannot fall lower than the fuel vapor pressure 304, which is the physical minimum of the system. This flattening is in contrast to the pressure characteristic of the actual delivery pressure when the sensor is functioning properly, wherein the actual delivery pressure continues to decrease until the next voltage pulse is applied, resulting in a sharp transition of the pressure signal from negative slope to positive slope at the trough pressure, e.g., such that the pressure signal remains at its minimum value for less than a threshold duration. The normal, pointed troughs that would occur for waveform 308 if the pressure could go lower than the fuel vapor pressure are shown by dashed lines. Similar to waveform 308, waveform 309 appears flattened at each trough, but the flattening occurs at a measured pressure higher than the fuel vapor pressure due to the sensor reading high.

In the example graph 330 shown in FIG. 3C, the fuel line pressure sensor is degraded and reads low (represented by waveform 311) compared with the actual delivery pressure (represented by waveform 310). Here again, the first exemplary feedback control strategy is being performed. Accordingly, waveform 311 has the same shape as waveform 310 but is shifted downward in the graph. In this case, the controller adjusts the voltage pulses applied to the lift pump in response to the (lower) sensed delivery pressure by increasing the duty cycle of the voltage pulses applied to the lift pump to a higher value relative to the duty cycle that would have been selected if the signal provided by the pressure sensor was accurate. As a result, the actual delivery pressure (waveform 310) increases overall relative to the delivery pressure during nominal pressure sensor operation (e.g., as represented by waveform 306 of FIG. 3A). Therefore, more voltage is supplied to LPP 208 than is needed to reach the desired peak pressure, which is undesirable as it decreases efficiency and increases power consumption. As shown, the peaks of waveform 310 are at a pressure higher than desired peak pressure 307. Further, in the depicted example, the actual delivery pressure has increased to such an extent that as a voltage pulse is applied to the lift pump, the pressure increases to the setpoint pressure of the pressure relief valve. The voltage then remains at the setpoint pressure for a duration (e.g., until it begins decreasing again due to fuel injection by fuel injectors/pumping by the DI pump), such that waveform 310 appears flattened at each peak. This is in contrast to the pressure characteristic of the actual delivery pressure when the sensor is functioning properly, wherein the actual delivery pressure continues to increase until fuel is consumed via injection of fuel into the engine by the fuel injectors, resulting in a sharp transition of the pressure signal from positive slope to negative slope at the peak pressure, e.g., such that the pressure signal remains at its maximum value for less than a threshold duration. The flattening of the peak occurs because the actual pressure cannot exceed the setpoint pressure 302. The normal, unflattened peaks that would occur if the pressure could exceed the setpoint pressure are shown by dashed lines. Similar to waveform 310, waveform 311 appears flattened at each peak, but the flattening occurs at a measured pressure lower than the setpoint pressure due to the low sensor reading.

As used herein, "flattening" of the sensed delivery pressure and actual delivery pressure refers to an event wherein the pressure waveform transitions from a non-zero slope to a zero slope and stays at the zero slope (e.g., remains constant) for more than a threshold duration. For example, the sensed pressure may transition from a negative slope to zero slope and then to a positive slope for a trough (as shown in FIG. 3B) or the other way around for a peak (as shown in FIG. 3C), in each case remaining at the zero slope for a threshold duration. The threshold duration may be predetermined during engine manufacturing and stored in non-transitory memory of the control system. Further, the threshold duration may be proportional to the duty cycle of the voltage pulses applied to the lift pump and in particular less than the duration (pulse width) of each voltage pulse. Flattening of the pressure waveform may alternatively be referred to as clipping of the waveform at the peaks and troughs, or plateauing of the waveform at its maximum and minimum values.

Whereas the example graphs shown in FIGS. 3B-3C pertained to pulsed operation of the LPP in accordance with the first exemplary feedback control strategy, the example graphs shown in FIGS. 3D-3E pertain to pulsed operation of the LPP in accordance with the second exemplary feedback control strategy. In example graph 340 shown in FIG. 3D, the pressure sensor is degraded and reads high (represented by waveform 313) compared with the actual delivery pressure (represented by waveform 312). In this example, the second exemplary feedback control strategy is being performed. At the beginning of the plot, the delivery pressure is decreasing as only a minimal voltage (e.g., slightly above 0) is being applied to the lift pump, and fuel injection is occurring. If the pressure sensor were functioning properly, it would correctly sense the actual delivery pressure reaching the desired trough pressure, and at that point the controller would increase the voltage applied to the lift pump to a higher voltage. However, because the pressure sensor is reading high, the controller does not increase the voltage applied to the lift pump to a higher voltage when the actual delivery pressure reaches the desired trough pressure; as shown, at that time, the sensed delivery pressure is still above the desired trough pressure, and thus pulsing of the lift pump to the higher voltage is not triggered. The actual delivery pressure thus continues to decrease until the sensed delivery pressure reaches the desired trough pressure. In the depicted example, due to the extent to which the pressure sensor is reading high, the actual delivery pressure decreases to the fuel vapor pressure before the sensed delivery pressure has decreased to the desired trough pressure. When the actual delivery pressure reaches the fuel vapor pressure, it cannot decrease further, and thus the remains constant at the fuel vapor pressure. The sensed delivery pressure also remains constant, but at a higher value, as shown. As the higher value is greater than the desired trough pressure, the controller does not does not increase the voltage applied to the lift pump to a higher voltage, and thus the actual delivery pressure remains stuck at the fuel vapor pressure. This can cause the engine to stall. A similar issue may occur if the fuel vapor pressure is higher than the fuel vapor pressure value stored at the controller. For example, if the actual fuel vapor pressure has increased above the desired trough pressure (which may occur due to a rapid increase in fuel temperature), the sensed pressure will not decrease to the desired trough pressure even if the pressure sensor is functioning properly. Here again, the controller will not increase the voltage applied to the LPP to a higher voltage as it is waiting for the delivery pressure to decrease to the desired trough pressure, which can result in an engine stall.

In example graph 350 shown in FIG. 3E, the pressure sensor is degraded and reads low (represented by waveform 315) compared with the actual delivery pressure (represented by waveform 314). In this example, the second exemplary feedback control strategy is being performed. At the beginning of the plot, the delivery pressure is decreasing as only a minimal voltage (e.g., slightly above 0) is being applied to the LPP, and fuel injection is occurring. If the pressure sensor were functioning properly, it would correctly sense the actual delivery pressure reaching the desired trough pressure, and at that point the controller would increase the voltage applied to the LPP to a higher voltage. However, because the pressure sensor is reading low, the controller increases the voltage applied to the LPP to a higher voltage when the sensed delivery pressure reaches the desired trough pressure, which occurs before the actual delivery pressure has decreased to the desired trough pressure. The actual delivery pressure thus does not reach the desired trough pressure, and instead begins increasing in response to the LPP being pulsed to the higher voltage. In the depicted example, due to the extent to which the pressure sensor is reading low, the actual delivery pressure increases to the pressure relief valve setpoint pressure before the sensed delivery pressure has increased to the desired peak pressure. When the actual delivery pressure reaches the pressure relief valve setpoint pressure, it cannot increase further, and thus remains constant at the pressure relief valve setpoint pressure. The sensed delivery pressure also remains constant, but at a lower value, as shown. As the lower value is lower than the desired peak pressure, the controller continues to apply the higher voltage to the LPP, and thus the actual delivery pressure remains stuck at the pressure relief valve setpoint pressure. This will disadvantageously result in increased fuel consumption and reduced durability of the fuel system, as the delivery pressure is kept higher than required for current engine operating conditions.

In the examples of sensor degradation described above, the pressure sensor (e.g., sensor 234 or 235 of FIG. 2) may read within the instrument's operating range, and the error will not be detected by previously described methods. In contrast, in accordance with the present disclosure, a flattening of the delivery pressure waveform (e.g., the delivery pressure remaining constant for greater than a threshold duration) can indicate pressure sensor degradation even when the pressure sensor output is within its normal operating range, as described further herein. What is more, the detection of such flattening alone can indicate pressure sensor degradation, such that detection of other parameters (e.g., magnitudes of the sensed delivery pressure) may not be needed. Accordingly, the control performed for pressure sensor diagnosis may advantageously be simplified.

Referring now to FIG. 4, an example routine 400 is shown for diagnosing an in-range error of a pressure sensor arranged downstream of a fuel lift pump in a fuel system. Instructions for carrying out routine 400 and the other routines disclosed herein (e.g., routines 500, 510, 530, 600, 700, and 1100) may be executed by a controller (such as controller 12 of FIG. 1) based on instructions stored in non-transitory memory of the controller and in conjunction with signals received from sensors of the engine, such as the sensors described above with reference to FIGS. 1-2. In carrying out the routines disclosed herein, the controller may send signals to various engine actuators to adjust engine operation, as described below.

At 402, the routine includes performing closed-loop feedback control of voltage pulses applied to the lift pump. The feedback control of the voltage pulses includes the controller receiving feedback from a pressure sensor downstream of the lift pump (e.g., pressure sensor 234 or 235 of FIG. 2) and adjusting the voltage applied to the lift pump (e.g., via adjustment of an actuator of the lift pump) based on the feedback from the pressure sensor. The feedback control may be performed in accordance with the first or second exemplary feedback control strategy discussed herein or another control strategy.

At 404, the routine includes determining whether entry conditions for diagnosing a pressure sensor in-range error are met. The entry conditions may include pressure sensor output existing within a predetermined normal operating range. For example, if the pressure sensor is degraded such that the output is outside of the normal operating range (e.g., an out-of-range pressure sensor error), in-range error diagnosis is not necessary. When an out-of-range error occurs, a corresponding OBD flag may be set at the controller, and thus, determining whether the entry conditions for the in-range error diagnosis are met may include the controller verifying the state of that OBD flag. Further, the entry conditions may include steady state engine operation and/or engine temperature (e.g., engine coolant temperature) exceeding a threshold. If the entry conditions are not met, for example, due to the presence of an out-of-range sensor error, the routine ends. Otherwise, the routine progresses to 406.

At 406, the routine includes sensing the delivery pressure of the lift pump with a pressure sensor. This may include continually sensing the delivery pressure of the lift pump throughout operation of the engine. After 406, the routine progresses to 408.

At 408, the routine includes the controller monitoring the sensed delivery pressure for flattening, for example, in accordance with the routine of FIG. 7, which is discussed below.

If flattening is detected at 410, the routine progresses to 412 and indicates an in-range error of the pressure sensor. In one example, indication of a pressure sensor in-range error may include the controller setting an OBD flag. Further, at 412, the routine includes switching the fuel lift pump from a closed-loop control scheme to an open-loop control scheme in which the lift pump is energized with a continuous non-zero voltage and pressure sensor feedback is not considered. Switching to open-loop lift pump control allows the fuel system to continue operating even when the pressure sensor is degraded, albeit with lower efficiency compared to closed-loop lift pump operation when the pressure sensor is not degraded. After 412, the routine ends.

Returning to 410, if flattening is not detected, the routine progresses to 414. At 414, the controller maintains closed-loop control of the lift pump. After 414, routine 400 ends.

Figure 5A:
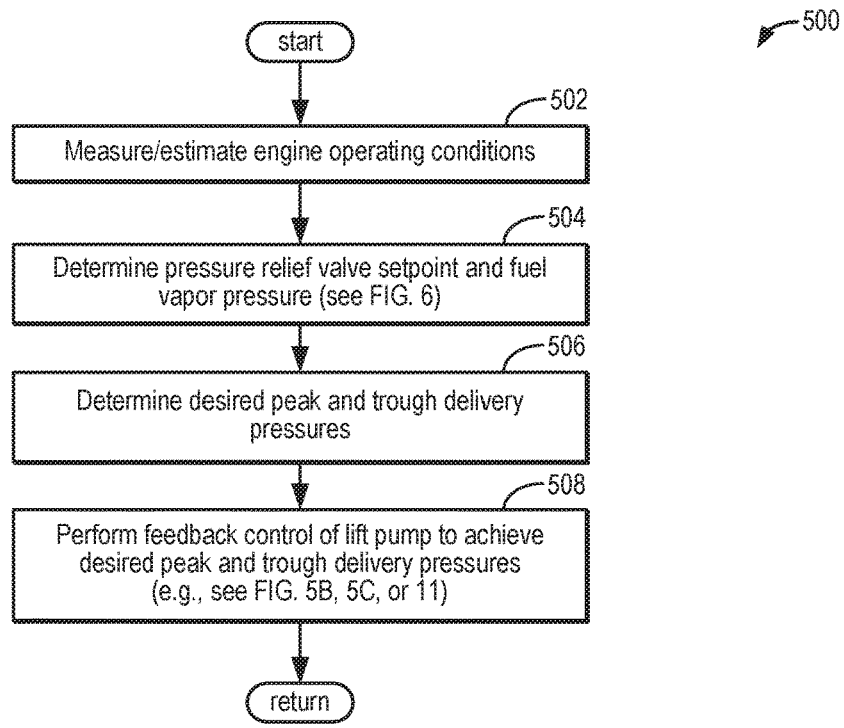
FIG. 5A shows a flow chart illustrating a routine for closed-loop control of a fuel lift pump.

Turning now to FIG. 5A, an example routine 500 is shown for performing closed-loop control of a fuel lift pump.

At 502, routine 500 includes measuring or estimating the engine operating conditions (e.g., fuel composition, fuel flow rate from the injectors, and current delivery pressure of the lift pump).

At 504, the routine includes determining the setpoint pressure and fuel vapor pressure. In one example, the setpoint pressure and fuel vapor pressure may be dynamically learned by the controller in the manner described below with reference to FIG. 6. In another example, the setpoint pressure may have a predetermined value that is stored in non-transitory memory of the controller, where the predetermined value is based on characteristics of the pressure relief valve (e.g., pressure relief valve 211 of FIG. 2) as well as characteristics of the fuel system, and the fuel vapor pressure may be calculated as a function of sensed fuel temperature and fuel composition.

At 506, the routine includes determining the desired peak and trough delivery pressures of the lift pump. The desired peak delivery pressure is a desired maximum pressure output by the lift pump, whereas the desired trough delivery pressure is a desired minimum pressure output by the lift pump. The desired peak delivery pressure may be below the setpoint pressure by a predetermined margin; similarly, the desired trough delivery pressure may be above the fuel vapor pressure by a predetermined margin.

Figure 11:
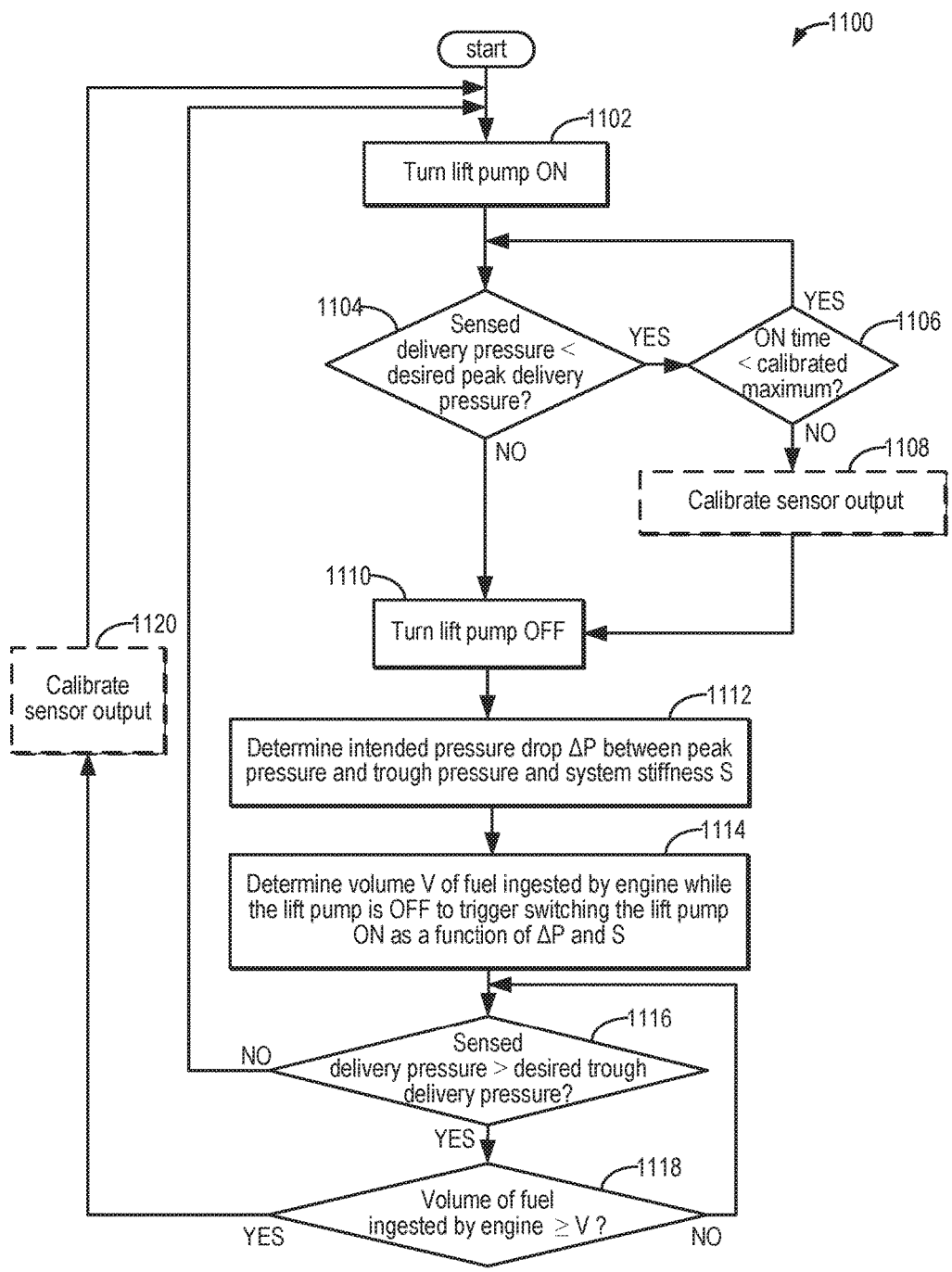
FIG. 11 shows a flow chart illustrating a routine for robust closed-loop control of a fuel lift pump.

At 508, the routine includes performing closed-loop feedback control of the lift pump to achieve the desired peak and trough delivery pressures, for example in accordance with the first exemplary feedback control strategy described herein (see FIG. 5B), the second exemplary feedback control strategy described herein (see FIG. 5C), or the third exemplary feedback control strategy described herein (see FIG. 11). After 508, the routine ends.

Figure 5B:
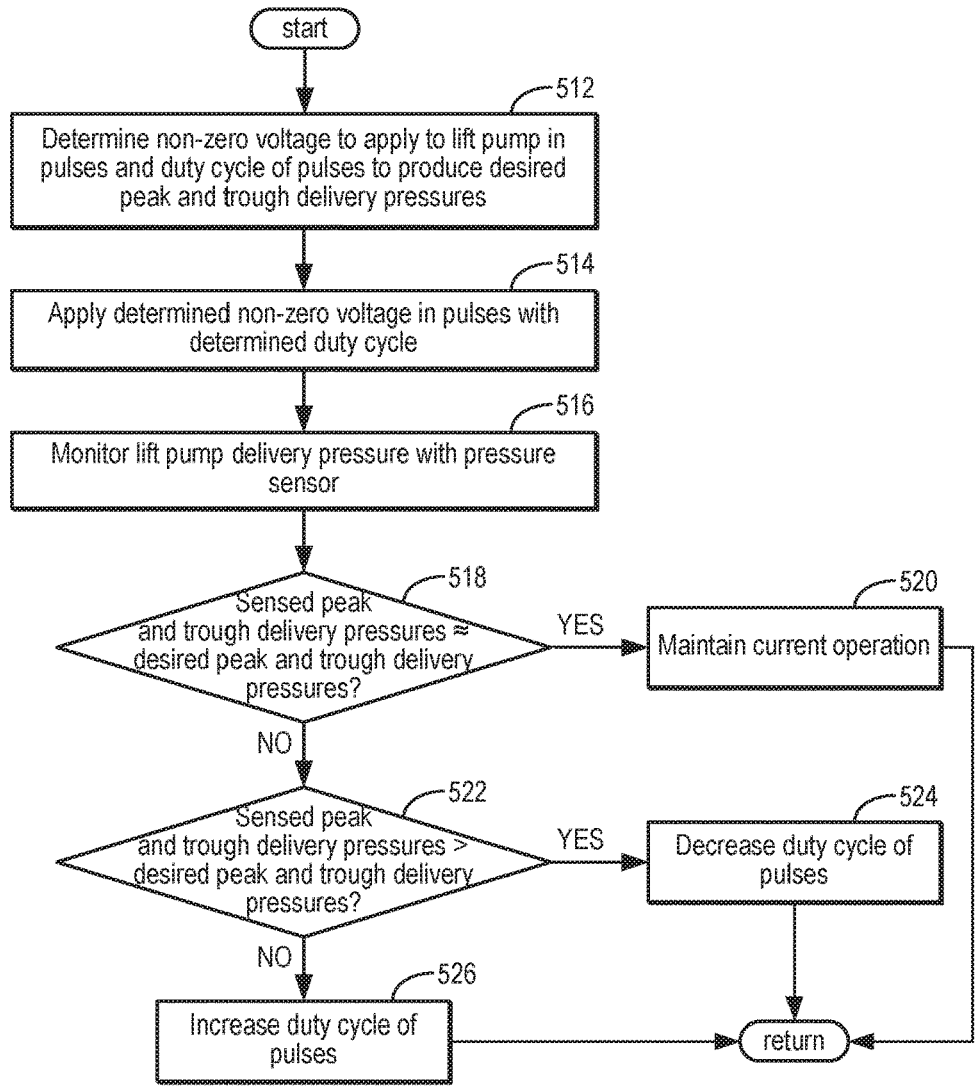
FIG. 5B shows a flow chart illustrating a routine for closed-loop control of a fuel lift pump in accordance with a first exemplary feedback control strategy, which may be performed in conjunction with the routine of FIG. 5A.

FIG. 5B shows an example routine 510 for performing the first exemplary feedback control strategy described herein. Routine 510 may be performed in conjunction with routine 500 of FIG. 5A at 508, for example.

At 512, the routine includes determining the magnitude of non-zero voltage pulses to apply to the lift pump and the duty cycle of the pulses that will produce the desired peak and trough delivery pressures determined in routine 500 at 506. For example, the voltage and/or duty cycle may be determined at the controller via a lookup table stored in non-transitory memory of the controller that indicates the appropriate voltage and duty cycle given values of parameters such as the fuel vapor pressure, setpoint pressure, desired peak and trough delivery pressures of the lift pump, fuel injection rate, DI pumping rate, etc. Alternatively, the voltage and/or duty cycle may be determined at the controller via functions that receive values of parameters (e.g., fuel vapor pressure, setpoint pressure, desired peak and trough delivery pressures, fuel injection rate, DI pumping rate, etc.) as inputs, and output the appropriate voltage and/or duty cycle for the pulses. The indicated voltage and duty cycle may be selected such that each voltage pulse applied to the lift pump increases delivery pressure to the desired peak pressure, and such that once the delivery pressure decreases from the desired peak pressure to the desired trough pressure, the next voltage pulse is applied. In some examples, the same non-zero effective voltage is always applied during pulsed operation of the lift pump, whereas the duty cycle of the pulses is varied as engine operating conditions change.

At 514, the routine includes applying voltage pulses to the lift pump, the pulses having the magnitude and duty cycle determined at 512. For example, the controller may send a signal to an actuator of the lift pump which in turn applies voltage pulses having the determined magnitude to the lift pump with the determined duty cycle.

At 516, the routine includes monitoring the delivery pressure of the lift pump (e.g., with a pressure sensor such as pressure sensor 234 or 235 of FIG. 2). The delivery pressure of the lift pump may be monitored over a duration, such as a duration that begins when a voltage pulse is applied and ends when the next voltage pulse is applied. Alternatively, the delivery pressure of the lift pump may be monitored continuously throughout engine operation.

After 516, the routine proceeds to 518 to determine whether the sensed peak and trough delivery pressures are within a predetermined range of (e.g., approximately equal to) the desired peak and trough delivery pressures of the lift pump, respectively. Determining whether the sensed peak and trough delivery pressures are within the predetermined range may include computing, at the controller, a difference between the sensed peak delivery pressure and the desired peak delivery pressure and comparing the absolute value of the difference to a threshold, and computing, at the controller, a difference between the sensed trough delivery pressure and the desired trough delivery pressure and comparing the absolute value of the difference to a threshold. If it is determined at 514 that the sensed peak and trough delivery pressures are within the predetermined range of the desired peak and trough delivery pressures, the routine progresses to 520, and the controller maintains current operation (e.g., continues to perform closed-loop control of the fuel lift pump without adjustment of the duty cycle/voltage of the pulses). Following 520, routine 500 returns.

However, if it is determined at 518 that the sensed peak and trough delivery pressures are not approximately equal to the desired peak and trough delivery pressures, the routine progresses to 518. At 518, the routine includes determining whether the sensed peak and trough delivery pressures are greater than the desired peak and trough delivery pressures, respectively (e.g., greater by more than a predetermined amount).

If the sensed peak and trough delivery pressures are greater than the desired peak and trough delivery pressures, respectively, the routine progresses to 524, and the duty cycle of the pulses applied to the lift pump is decreased. For example, the controller may send a signal to an actuator of the lift pump to decrease the duty cycle of the voltage pulses applied to the lift pump. The decrease in the duty cycle may be selected by the controller to be proportional to the difference between the sensed peak and trough delivery pressures and the desired peak and trough delivery pressures, in some examples. In this way, the controller may decrease the overall amount of voltage supplied to the fuel lift pump, thereby decreasing the delivery pressure of the lift pump. Following 524, the routine returns.

Returning to 522, if it is instead determined that the sensed peak and trough delivery pressures are less than the desired peak and trough delivery pressures, respectively, the routine progresses to 526, and the duty cycle of the pulses applied to the lift pump is increased. For example, the controller may send a signal to an actuator of the lift pump to increase the duty cycle of the voltage pulses applied to the lift pump. The increase in the duty cycle may be selected by the controller to be proportional to the difference between the sensed peak and trough delivery pressures and the desired peak and trough delivery pressures, in some examples. In this way, the controller may increase the overall amount of voltage supplied to the fuel lift pump, thereby increasing the peak and trough delivery pressures of the lift pump. Following 526, the routine returns.

In some examples, routine 500 may be performed in an iterative manner during closed-loop control of the lift pump, which allows the controller to continuously adjust the amount of voltage applied to the fuel lift pump as the desired peak and trough delivery pressures vary.

Figure 5C:
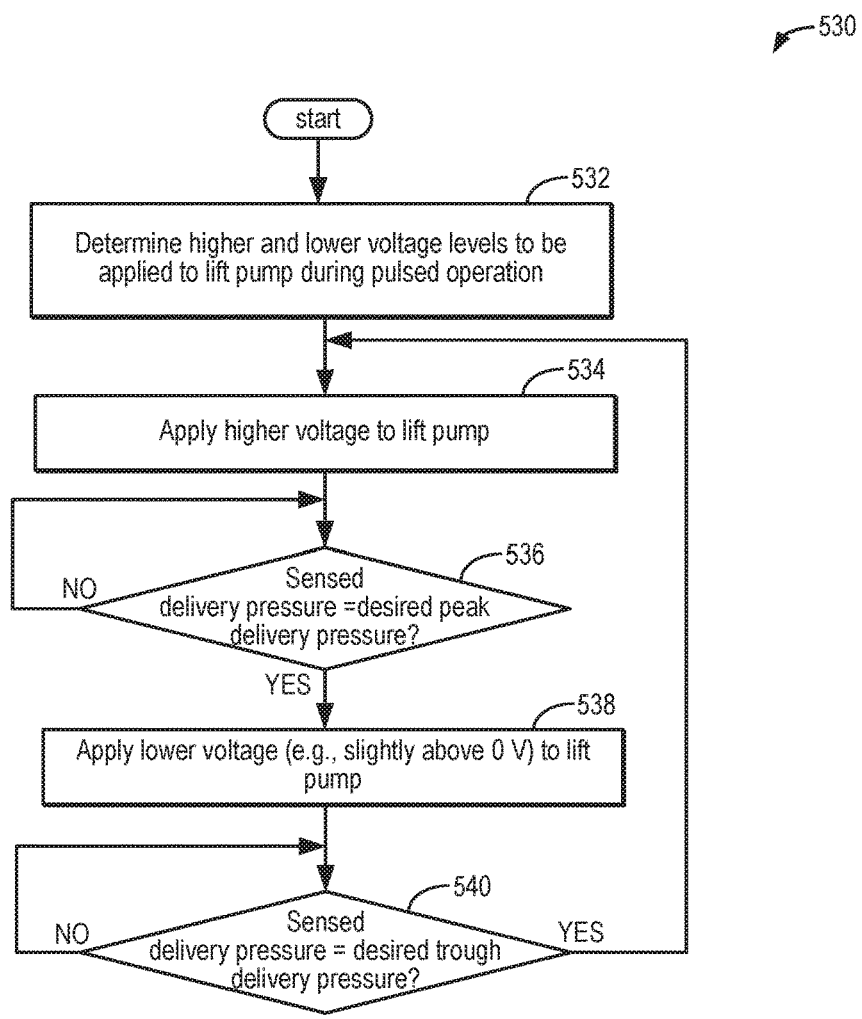
FIG. 5C shows a flow chart illustrating a routine for closed-loop control of a fuel lift pump in accordance with a second exemplary feedback control strategy, which may be performed in conjunction with the routine of FIG. 5A.

FIG. 5C shows an example routine 530 for performing the second exemplary feedback control strategy described herein. Routine 530 may be performed in conjunction with routine 500 of FIG. 5A at 508, for example.

At 532, the routine includes determining higher and lower voltage levels to be applied to the lift pump during pulsed operation. The higher voltage level may be a predetermined voltage level which will quickly raise the delivery pressure to the desired peak pressure (e.g., 8-12 V), whereas the lower voltage level may be a predetermined voltage level which is low enough to keep the lift pump energized (e.g., greater than 0 V and less than 0.3 V) and which does not substantially increase fuel pressure. When the higher voltage level is applied to the lift pump, the lift pump may be considered to be in an ON state, whereas when the lower voltage level is applied to the lift pump, the lift pump may be considered to be in an OFF state, despite the fact that a minimal amount of voltage is still being applied.

After 532, the routine proceeds to 534 and the controller applies the determined higher voltage to the lift pump.

After 534, the routine proceeds to 536 and the controller determines whether the sensed delivery pressure is equal to the desired peak delivery pressure. If not, the routine continues monitoring the sensed delivery pressure until it is equal to the desired peak delivery pressure. As discussed above with reference to FIG. 3E, if the pressure sensor is malfunctioning and reads low, this may result in the sensed delivery pressure never reaching the desired peak delivery pressure. In this case, the routine would be stuck at 534 and fuel economy and fuel system durability would be negatively affected.

Once the controller determines that the sensed delivery pressure until it is equal to the desired peak delivery pressure, the routine proceeds to 538 and the controller determines whether the sensed delivery pressure is equal to the desired trough delivery pressure. If not, the routine continues monitoring the sensed delivery pressure until it is equal to the desired trough delivery pressure. As discussed above with reference to FIG. 3D, if the pressure sensor is malfunctioning and reads high, this may result in the sensed delivery pressure never reaching the desired trough delivery pressure. In this case, the routine would be stuck at 538 and the engine could potentially stall due to lack of adequate fuel pressure.

It will be appreciated that performance of routine 530 may be interrupted and/or suspended by the controller in order to switch to a different fuel system control strategy or turn off the engine.

Figure 6:
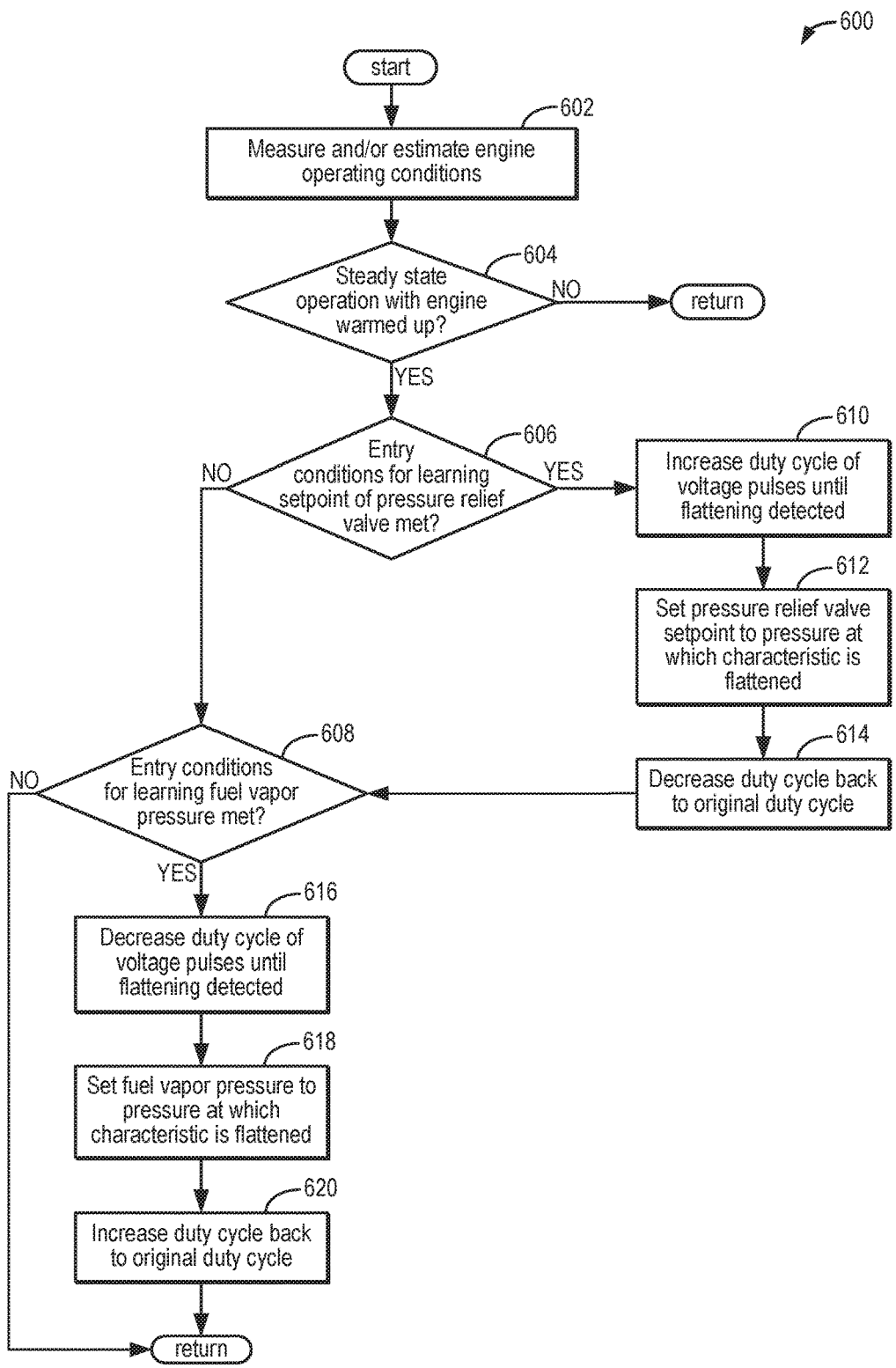
FIG. 6 shows a flow chart illustrating a routine for adjusting operation of a fuel system with a controller to learn a pressure relief valve setpoint pressure and fuel vapor pressure of the fuel system.

FIG. 6 shows an example routine 600 for determining the setpoint pressure (e.g., the physical maximum pressure in the fuel system for current engine operating conditions) and the fuel vapor pressure (e.g., the physical minimum pressure in the fuel system for current engine operating conditions). In accordance with routine 600, the controller may initiate a determination of the setpoint pressure during engine operating conditions where the desired peak and trough delivery pressures of the lift pump are relatively high. Further, the controller may initiate a determination of the fuel vapor pressure when the desired peak and trough delivery pressures of the lift pump are relatively low. In this way, dynamic learning of the setpoint pressure and fuel vapor pressure may be performed intermittently during engine operation in a manner that takes advantage of fluctuations in the desired peak and trough delivery pressures of the lift pump, so as to minimize active adjustments to engine operation associated with performing the dynamic learning.

At 602, the routine begins by measuring and/or estimating the engine operating conditions, for example, in the manner described above for routine 500 at 502.

At 604, the routine includes determining if the engine is operating in steady state and warmed up. For example, it may be determined that the engine is operating in steady state if the engine speed remains substantially constant for at least a threshold duration. Further, it may be determined that the engine is warmed up if engine temperature is determined to be greater than a threshold temperature (e.g., based on output from an engine coolant temperature sensor). Routine 600 returns if the engine is not warmed up and in steady state operation. Otherwise, if the engine is warmed up and operating in steady state, the routine progresses to 606.

At 606, the routine includes determining if the entry conditions for learning the setpoint pressure are met. In one example, the entry conditions for learning the setpoint pressure include the peak delivery pressure being greater than a threshold and/or the trough delivery pressure being greater than a threshold. In another example, the entry conditions for learning the setpoint pressure include the engine load being greater than a threshold. If at 606 it is determined that the entry conditions for learning the setpoint pressure are not met, the routine proceeds to 608 to determine if the entry conditions for learning the fuel vapor pressure are met, which will be explained in further detail below. Otherwise, if the entry conditions for learning the setpoint pressure are met at 606, the routine proceeds to 610.

At 610, the routine includes increasing the duty cycle of voltage pulses applied to the fuel lift pump until the sensed delivery pressure of the pump flattens. Flattening may be determined in accordance with routine 700 of FIG. 7, which is discussed below. Flattening of the sensed delivery pressure represents hitting a physical limit of the fuel system. In this example, the physical limit is the setpoint pressure. The pressure in the fuel system cannot exceed this pressure; when the pressure in the fuel system reaches the setpoint pressure, the pressure relief valve opens and fuel flows back to the fuel tank. The pressure relief valve remains open until the pressure in the fuel system decreases to the setpoint pressure, at which point the pressure relief valve closes.

At 612, the routine includes setting the setpoint pressure to the pressure at which the flattening occurred. In this way, the controller learns the maximum possible delivery pressure. Because the fuel pressure sensor may clog or otherwise degrade, for example, this value may change over time. Therefore, it is advantageous for the controller to periodically relearn this value. As one example, knowing the maximum pressure of the system may help the controller distinguish in-range pressure sensor error, as described in detail below with reference to FIG. 7. Furthermore, knowing the setpoint pressure with high accuracy may enable the controller to set the desired peak delivery pressure to be below the setpoint pressure by a small margin (e.g., 20 kPa). In one non-limiting example, if the setpoint pressure is determined to be 650 kPa, the desired peak delivery pressure may be set to 630 kPa. As such, the duty cycle of the voltage pulses applied to the fuel lift pump to achieve the desired peak delivery pressure may be reduced, thereby improving fuel economy.

After 612, the routine proceeds to 614. At 614, the routine includes returning to normal closed-loop control of the lift pump (e.g., by executing routine 500 of FIG. 5A). For example, this may include the controller determining a duty cycle of lift pump activation that will adjust the peak delivery pressure to the desired peak delivery pressure and controlling an actuator of the lift pump to adjust the duty cycle of the voltage pulses applied to the lift pump to the determined duty cycle. The adjustment may include decreasing the duty cycle of the lift pump voltage pulses so that the delivery pressure remains below the setpoint pressure. After 614, the routine progresses to 608.

At 608, the routine includes determining if the entry conditions for learning the fuel vapor pressure are met. In one example, the entry conditions for learning the fuel vapor pressure include the peak delivery pressure being less than a threshold and/or the trough delivery pressure being less than a threshold. In another example, the entry conditions for learning the fuel vapor pressure include the engine load being less than a threshold. If at 608 it is determined that the entry conditions for learning the fuel vapor pressure are not met, routine 600 ends. Otherwise, if the entry conditions for learning the fuel vapor pressure are met, the routine proceeds to 616.

At 616, the routine includes decreasing the duty cycle of the voltage pulses applied to the fuel lift pump until the delivery pressure of the pump flattens (e.g., as measured by pressure sensor 234 or 235 of FIG. 2). Flattening may be determined in accordance with routine 700 of FIG. 7, which is discussed below. Flattening of the sensed delivery pressure represents hitting a physical limit of the fuel system. In this example, the physical limit is the fuel vapor pressure.

At 618, the routine includes setting the fuel vapor pressure to the pressure at which flattening occurs, as determined at 616. In this way, the controller learns the minimum delivery pressure possible for the fuel system. Fuel temperature may fluctuate during vehicle operation, thereby changing the fuel vapor pressure. Determining the fuel vapor pressure in accordance with routine 600 may be more accurate than computing the fuel vapor pressure based on sensed or inferred fuel composition and temperature. Knowing the fuel vapor pressure at a given time with high accuracy may enable the fuel system to operate at a small pressure above the fuel vapor pressure without the risk of losing the desired pressure margin between the vapor pressure and the injection pressure due to temperature fluctuation. For example, this method could be used in place of the Hot Injector Compensation method, wherein less fuel is metered than intended due to operating at a larger pressure (e.g., 50 or 100 kPa) above the fuel vapor pressure. Further, knowing the minimum pressure of the system may help the controller distinguish in-range pressure sensor error, as described further below with reference to FIG. 7.

At 620, the routine includes returning to normal closed-loop control of the lift pump (e.g., by executing routine 500 of FIG. 5A). For example, this may include the controller determining a duty cycle of lift pump activation that will adjust the peak delivery pressure to the desired peak delivery pressure and controlling an actuator of the lift pump to adjust the duty cycle of the voltages pulses applied to the lift pump to the determined duty cycle. The adjustment may include increasing the duty cycle of the lift pump voltage pulses so that the delivery pressure remains above the fuel vapor pressure. After 620, the routine returns.

Figure 7:
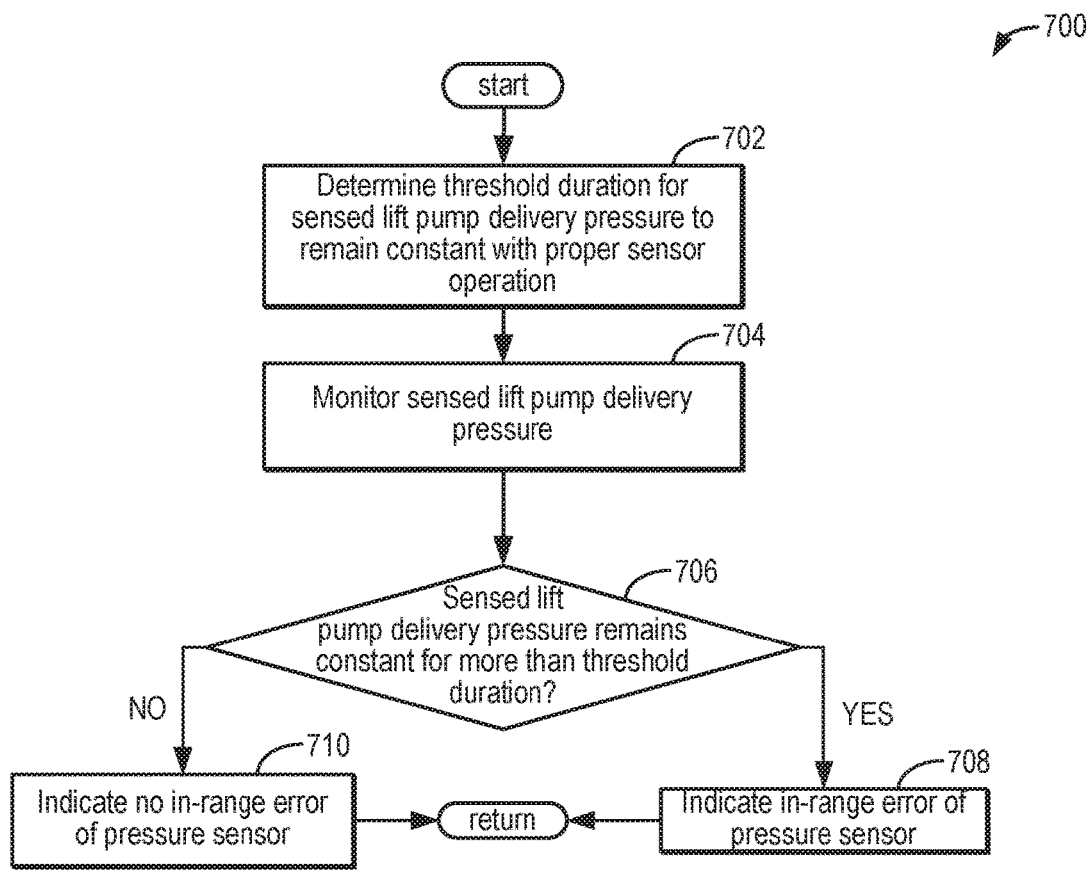
FIG. 7 shows a flow chart illustrating a routine for diagnosing an in-range error in the output of a pressure sensor downstream of a fuel lift pump.

FIG. 7 shows an example routine 700 for diagnosing an in-range fuel pressure sensor error. An in-range error may occur when the output of the pressure sensor appears is within an expected range (e.g., the sensor output voltage is non-zero and an industry standard range out-of-range check does not indicate that the output is out-of-range). When an in-range error is occurring, the output of the pressure sensor corresponds to a pressure that is higher or lower than the actual delivery pressure but still within a normal pressure range of the fuel system.

At 702, the routine includes determining a threshold duration for the sensed pressure to remain constant during proper sensor operation. For example, as discussed above with reference to FIGS. 3A-3E, during pulsed operation of the lift pump, the delivery pressure fluctuates in a sawtooth pattern which includes sharp peaks and troughs. The threshold duration may be a longest duration at which the pressure is expected to remain at the peak or trough pressure for current operating conditions. The threshold duration may be determined empirically, e.g. during manufacturing of the vehicle, and stored in non-transitory memory of the controller, e.g. in a lookup table which stores threshold durations corresponding to different operating conditions such as different pulse widths of the voltage pulses applied to the lift pump. As discussed below with reference to FIG. 9, the threshold duration at a given time may be substantially less than the pulse width of the voltage pulses applied to the lift pump at that time.

At 704, the routine includes monitoring the sensed delivery pressure (e.g., as measured by sensor 234 or 235 of FIG. 2). In some examples, the monitoring may be stopped as soon as the sensed delivery pressure remains constant for greater than the threshold duration, even if that happens before the end of the application of the first voltage pulse during the monitoring. In other examples, the monitoring may performed during application of a predetermined number of voltage pulses to the lift pump regardless of whether the sensed delivery pressure remains constant for greater than the threshold duration before the predetermined number of voltage pulses have all been applied. The predetermined number may be one, two, three or any other number of voltage pulses.

At 706, the routine includes determining if the sensed delivery pressure has remained constant for more than a threshold duration, e.g. the threshold duration determined at 702. In some examples, the sensed delivery pressure remaining constant for more than the threshold duration generates an interrupt. In response to a determination that the sensed delivery pressure has remained constant for more than the threshold duration, the routine proceeds to 708 and the controller indicates an in-range error (e.g., by setting an OBD flag). Following step 708, the routine returns.

Returning to 706, if the sensed pressure does not remain constant for more than a threshold duration during the monitoring, the routine progresses to 710, and the controller indicates that there is no in-range error of the pressure sensor (e.g., by not setting an OBD flag). Following 710, the routine returns.

Figure 8:
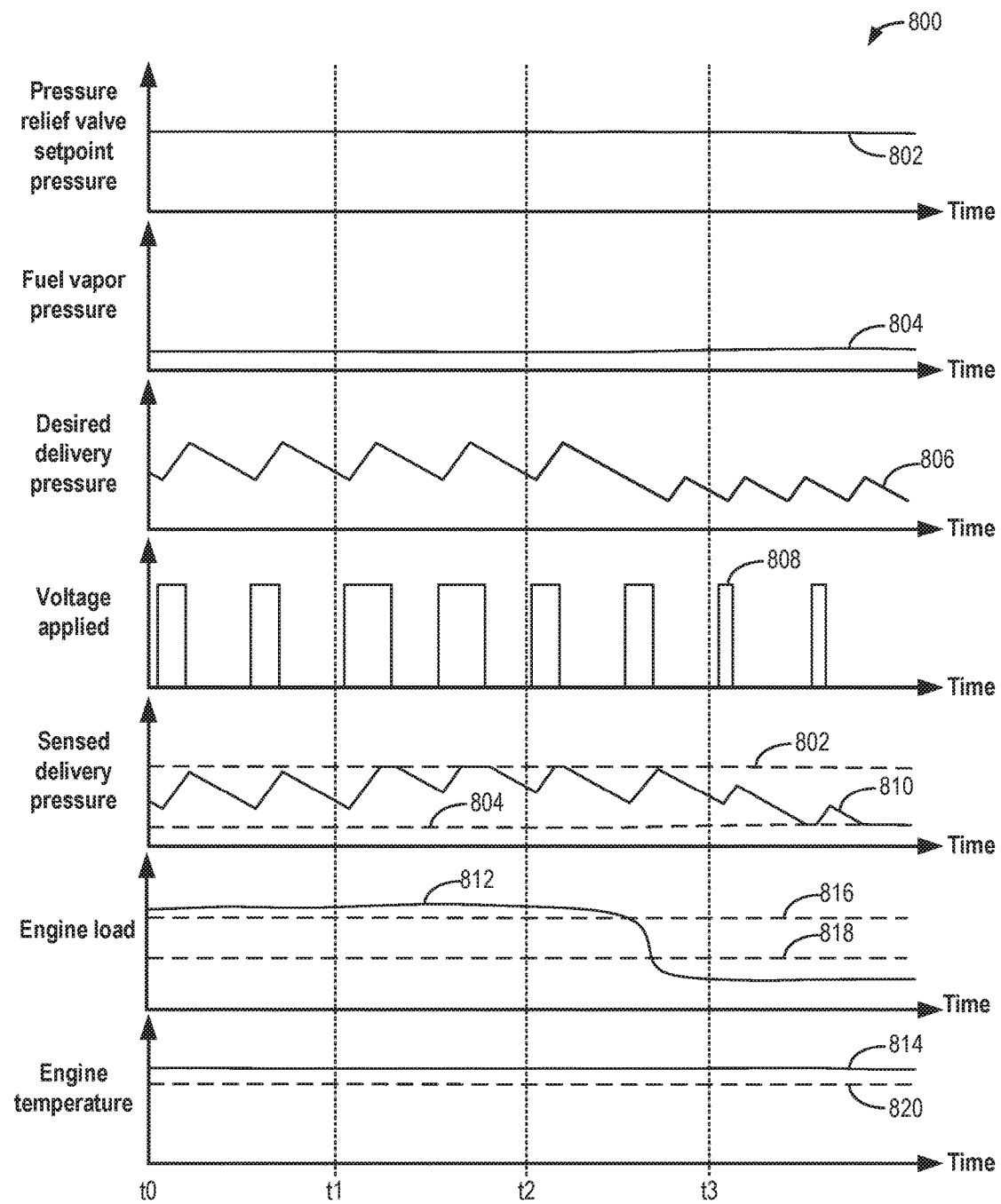
FIG. 8 shows a map of example plots of signals of interest during adjustment of operation of a fuel system with a controller to learn a pressure relief valve setpoint pressure and fuel vapor pressure of the fuel system, in accordance with the routine of FIG. 6.

Turning now to FIG. 8, it shows an example map 800 illustrating signals of interest during dynamic learning of the setpoint pressure and fuel vapor pressure of a fuel system, e.g. in accordance with routine 600 of FIG. 6. Map 800 depicts the setpoint pressure at plot 802, the fuel vapor pressure at plot 804, the desired (e.g., commanded) delivery pressure at plot 806, the voltage applied to the lift pump at plot 808, the sensed delivery pressure of the lift pump at plot 810, the engine load at plot 812, and the engine temperature at plot 814. For all of the above plots, the X-axis represents time, with time increasing along the X-axis from left to right. The Y-axis of each individual plot corresponds to the labeled parameter, with the value increasing from bottom to top. Additionally, line 816 represents a first higher threshold value for engine load, line 818 represents a second lower threshold value for engine load, and line 820 represents a threshold value for engine temperature.

The expected physical behavior of the fuel system is that the pressure relief valve setpoint pressure 802 is constant over life. In contrast, the fuel vapor pressure 804 is dependent on fuel composition and strongly linked with fuel temperature. Thus, it will change significantly as the vehicle warms up with operation. However, between the fuel composition specification and design actions, the maximum fuel vapor pressure is expected to be limited to a worse case value. In normal operation, the desired peak pressure is set to be below pressure relief valve setpoint pressure 802 and the desired trough pressure is set to be above fuel vapor pressure 804. However, to discover the values of each, the controller may purposely violate that normal objective.

Between t0 and t1, the fuel lift pump may be operated under a closed-loop control scheme, e.g. in accordance with routine 500 of FIG. 5A. The controller, such as controller 12 of FIG. 1, sends a signal to an actuator of the lift pump which causes the actuator to apply non-zero voltage pulses to the lift pump at a duty cycle which will produce a desired delivery pressure characteristic 806. As shown, desired delivery pressure characteristic 806 may vary with engine load. The energizing voltage pulses applied to the lift pump to obtain the desired delivery pressure characteristic 806 are shown at plot 808. The delivery pressure of the fuel lift pump, as measured by a sensor (e.g., pressure sensor 234 or 235 of FIG. 2) and illustrated at plot 810, increases in response application of voltage to the lift pump. Between energizing pulses, when zero voltage is applied to the lift pump, the delivery pressure of the lift pump decreases due to fuel consumption by the engine.

It may be favorable to dynamically learn the fuel vapor pressure and setpoint pressure in order to maximize fuel economy, as described in detail above with reference to FIG. 6. In order to proceed with dynamic learning of either the fuel vapor pressure or the setpoint pressure, however, the engine must be in steady state operation and warmed up, and the corresponding entry conditions must be met. In example shown in map 800, between t0 and t1, the engine is operating in steady state, and thus engine load 812 remains substantially constant. Further, the engine temperature 814 is greater than the threshold value represented by dashed line 820, indicating that the engine is warmed up. Furthermore, engine load is above the first higher threshold value 816. Therefore, at t1, the entry conditions for learning the setpoint pressure are met. In other examples, however, additional entry conditions may need to be met before learning the setpoint pressure.

Between t1 and t2 of map 800, the controller learns the setpoint pressure 802, which is the maximum delivery pressure possible in the fuel system due to the presence of the pressure relief valve. As shown, in order to determine the maximum delivery pressure, the controller increases the duty cycle of the voltage pulses 808 applied to the fuel lift pump at t1. This increase is not responsive to change in engine operating conditions (e.g., an increase in engine load), or an increase in desired (e.g., requested or commanded) delivery pressure; rather, the increase is performed for the sole purpose of determining the maximum delivery pressure of the fuel system, which corresponds to the setpoint pressure of the pressure relief valve. For example, despite engine load 812 remaining substantially constant between time t0 and time t1, the controller nonetheless increases the duty cycle of the voltage pulses applied to the fuel lift pump in order to perform the dynamic learning of the setpoint pressure.

When the sensed delivery pressure 810 reaches the setpoint pressure 802, the waveform of the sensed delivery pressure develops a flattened peak characteristic. In the depicted example, the delivery pressure reaches the setpoint pressure during application of the first voltage pulse having an increased pulse width. In other examples, however, the ramping up of the duty cycle may be performed incrementally, such that the sensed delivery pressure does not reach the setpoint pressure until multiple voltage pulses have been applied, advantageously reducing the abruptness of the increase in pressure delivered to the fuel injectors. Further, incremental ramping up of the duty cycle provides for flattened peak detection while minimizing the delivery pressure increase, such that the delivery pressure remains closer to the optimal delivery pressure for current engine operating conditions.

In map 800, the setpoint pressure is 650 kPa, and the sensed delivery pressure waveform flattens (remains constant) at 650 kPa for a non-trivial duration. This particular setpoint pressure is only an example; the setpoint pressure will vary depending on the characteristics of the pressure relief valve and fuel system.

In the depicted example, the controller continues to monitor the sensed delivery pressure after flattening is detected; specifically, another voltage pulse is applied after once instance of flattening has been sensed, such that the delivery pressure signal flattens twice at the peak. Applying one or more additional voltage pulses with an increased pulse width relative to the nominal pulse width even after detecting a first instance of flattening may be advantageous in that it may reduce a false positive detection of flattening (e.g., when an anomaly occurs resulting in temporary flattening of the sensed delivery pressure signal which is not indicative of the actual setpoint pressure). However, in other examples, the controller may end the setpoint pressure learning procedure as soon as flattening is detected, and update the stored setpoint pressure to be the pressure at which the flattening occurred. This may limit the duration of time during which the voltage applied to the lift pump is increased by the controller to perform the learning, and therefore improve fuel economy.

Upon detection of the flattening of the sensed delivery pressure waveform, the controller compares the pressure at which the sensed delivery pressure has flattened with a previously determined setpoint pressure stored in non-transitory memory. As the setpoint pressure is subject to change over time (e.g., as the pressure relief valve clogs, or as other parameters of the fuel system change), it may be desirable to re-learn the setpoint pressure periodically; towards this end, routine 600 may be performed intermittently, or optionally continuously, during pulsed operation of the lift pump. In other examples, routine 600 may be performed only when pulsed operation of the lift pump is initiated.

At t2, the controller ends the setpoint pressure learning process and switches operation of the lift pump back to the closed-loop control scheme described in routine 500 of FIG. 5A. For example, as shown, the controller may decrease the duty cycle of the voltage pulses 808 applied to the lift pump to a value which reflects current engine operating parameters (e.g., the same value applied from time t0 to t1).

Between t2 and t3, engine load 812 decreases to a level which is lower than second threshold 818. The decrease in engine load may occur due to a change in engine operation (e.g., a transition to idling operation, or downhill travel of the vehicle). Further, the engine temperature 814 is greater than the threshold value represented by dashed line 820, indicating that the engine is warmed up. Therefore, at t3, the entry conditions for learning the fuel vapor pressure are met. In other examples, however, additional entry conditions may need to be met before learning the fuel vapor pressure. For example, as fuel vapor pressure is a function of fuel temperature in the fuel system, the entry conditions may include fuel temperature remaining substantially constant for at least a threshold duration.

Upon determining that the entry conditions have been met at t3, the controller alters operation of the lift pump in order to learn the fuel vapor pressure by decreasing the duty cycle of the voltage pulses 808 applied to the fuel lift pump. This decrease is not responsive to a change in engine operating conditions (e.g., a decrease in engine load), or a decrease in desired (e.g., requested or commanded) delivery pressure; rather, the decrease is performed for the sole purpose of determining the maximum delivery pressure of the fuel system, which corresponds to the setpoint pressure of the pressure relief valve. For example, despite engine load 812 remaining substantially constant from the time period immediately prior to t3 until t3, the controller nonetheless decreases the duty cycle of the voltage pulses applied to the lift pump at t3 in order to perform the dynamic learning of the fuel vapor pressure.

When the delivery pressure 810 reaches the fuel vapor pressure 804, the waveform of the sensed delivery pressure develops a flattened trough characteristic. In the depicted example, the delivery pressure reaches the fuel vapor pressure after application of the first voltage pulse having a decreased pulse width, and prior to application of a second voltage pulse having a decreased pulse width. In other examples, however, the decreasing of the duty cycle may be performed incrementally, such that the sensed delivery pressure does not reach the fuel vapor pressure until multiple voltage pulses have been applied, advantageously reducing the abruptness of the decrease in pressure delivered to the fuel injectors. Further, incremental decreasing of the duty cycle provides for flattened trough detection while minimizing the delivery pressure decrease, such that the delivery pressure remains closer to the optimal delivery pressure for current engine operating conditions.

In map 800, the fuel vapor pressure is 300 kPa, and the sensed delivery pressure waveform flattens (remains constant) at 300 kPa for a non-trivial duration. This particular fuel vapor pressure is only an example; the fuel vapor pressure will vary depending on the operating conditions of the fuel system (e.g., fuel temperature). Therefore, it may be beneficial to re-learn the fuel vapor pressure periodically.

In the depicted example, the controller continues to monitor the sensed delivery pressure after flattening is detected; specifically, another voltage pulse is applied after once instance of flattening has been sensed, such that the delivery pressure signal flattens twice at the trough. As discussed above with reference to learning the setpoint pressure, applying one or more additional voltage pulses with a decreased pulse width relative to the nominal pulse width even after detecting a first instance of flattening may be advantageous in that it may reduce a false positive detection of flattening (e.g., when an anomaly occurs resulting in temporary flattening of the sensed delivery pressure signal which is not indicative of the actual fuel vapor pressure). However, in other examples, the controller may end the fuel vapor pressure learning procedure as soon as flattening is detected, and update the stored fuel vapor pressure to be the pressure at which the flattening occurred. This may limit the duration of time during which the delivery pressure is modified from the requested delivery pressure in order to perform learning, and therefore improve engine operation.

Upon detection of the flattening of the sensed delivery pressure waveform, the controller stores the pressure at which the sensed delivery pressure has flattened in non-transitory memory as the fuel vapor pressure. Routine 600 may be performed intermittently, or optionally continuously, during pulsed operation of the lift pump, in order to improve accuracy of the closed-loop control. In other examples, routine 600 may be performed only when pulsed operation of the lift pump is initiated.

After learning the fuel vapor pressure, the controller switches operation of the lift pump back to the closed-loop control scheme described in routine 500 of FIG. 5A. For example, the controller may adjust the duty cycle of the voltage pulses 808 applied to the lift pump to a value which reflects current engine operating parameters (e.g., the current desired delivery pressure characteristic of the lift pump represented by plot 806).

While map 800 illustrates dynamic learning of the setpoint pressure followed shortly thereafter by dynamic learning of fuel vapor pressure, this sequence of events is only exemplary. Dynamic learning of the setpoint pressure may be performed any time corresponding entry conditions (including engine load above the first higher threshold) are met, and similarly, dynamic learning of fuel vapor pressure may be performed any time the corresponding entry conditions (including engine load below the second lower threshold) are met.

In examples where the vehicle including the fuel system is a hybrid vehicle, engine load may be increased or decreased when it is desired to learn the setpoint pressure or fuel vapor pressure even when engine load is not in the appropriate range (e.g., above the first higher threshold or below the second lower threshold), by adding or removing some amount of load from the engine via the electric machine and the battery. For example, rather than waiting until engine load exceeds the first higher threshold to learn the setpoint pressure, engine load may be increased to above the first higher threshold, and the excess engine output may be converted into electrical energy via the electric machine (operating in a generating mode) and stored in the energy storage device. Conversely, rather than waiting until engine load falls below the second lower threshold to learn the fuel vapor pressure, engine load may be decreased to below the second lower threshold, and the battery and electric machine (operating in a motor mode) may provide supplemental torque to vehicle wheels, such that the requested torque is still provided to vehicle wheels despite the decrease in engine load.

Further, in examples where the vehicle including the fuel system is a hybrid vehicle, and the robust feedback control strategy is performed, a volume of fuel ingested by the engine may be monitored while the lift pump is OFF. If the volume of fuel ingested by the engine while the lift pump is OFF reaches a predetermined volume before an output signal of the pressure sensor has decreased to a desired trough pressure, the lift pump may be turned ON, the value of the output signal of the pressure sensor may be stored as a first stored value, dynamic learning of a fuel vapor pressure of the fuel system may be requested. As discussed above, if the volume of fuel ingested by the engine while the lift pump is OFF exceeds an expected amount for current operating conditions, yet the desired trough pressure has not yet been reached, this indicates that either the sensor is inaccurate, or the fuel vapor pressure has changed (e.g., has risen to above the desired trough pressure). In order to discern which of these issues is present, the controller may perform dynamic learning of the fuel vapor pressure by reducing fuel rail pressure until it will not reduce further. In order to do so without comprising desired engine operation during conditions where requested engine output torque is above a threshold, the motor/generator may be used to supplement engine output torque. Thus, if a requested vehicle wheel torque is above a first threshold, the controller may send signals to actuators to mechanically couple a crankshaft of the engine to the motor/generator and decrease engine load until the output signal of the pressure sensor remains constant for at least a first threshold duration while converting electrical energy to torque with the motor/generator and providing the torque the vehicle wheels. The pressure at which the output signal remains constant may then be stored as an updated fuel vapor pressure, and if the updated fuel vapor pressure is less than the first stored value, the controller may indicate that the pressure sensor is reading high. In this case, calibration of sensor output may subsequently be performed, which may take into account the difference between the updated fuel vapor pressure and the first stored value. Otherwise, the controller may indicate that the pressure sensor is reading correctly and not degraded, and perform subsequent feedback control of the lift pump based on the updated fuel vapor pressure.

Similarly, during pulsed operation of the lift pump, an ON time of the lift pump may be monitored; if the ON time of the lift pump reaches a calibrated maximum ON time before the output signal of the pressure sensor has increased to a desired peak pressure, the lift pump may be turned OFF, the value of the output signal of the pressure sensor may be stored as a second stored value, and dynamic learning of a setpoint pressure of the pressure relief valve may be requested. As discussed above, if lift pump remains ON for a calibrated maximum ON time, yet the desired peak pressure has not yet been reached, this indicates that either the sensor is inaccurate, or the pressure relief valve setpoint has changed (e.g., has decreased from the stored value). In order to discern which of these issues is present, the controller may perform dynamic learning of the setpoint pressure by increasing fuel rail pressure until it will not reduce further. In order to do so without comprising desired engine operation during conditions where requested engine output torque is below a threshold, the motor/generator may be used to absorb excess engine output torque. Thus, if a requested vehicle wheel torque is below a second threshold, the controller may send signals to actuators to mechanically couple the crankshaft to the motor/generator, increase engine load until the output signal of the pressure sensor remains constant for at least a second threshold duration while converting a portion of engine output torque to electrical energy with the motor/generator and storing the electrical energy at the battery, and store the pressure at which the output signal remains constant as an updated setpoint pressure. If the updated setpoint pressure is greater than the second stored value, the controller may indicate that the pressure sensor is reading low. In this case, calibration of sensor output may subsequently be performed, which may take into account the difference between the updated setpoint pressure and the second stored value. Otherwise, the controller may indicate that the pressure sensor is reading correctly and not degraded, and perform subsequent feedback control of the lift pump based on the updated setpoint pressure.

Figure 9:
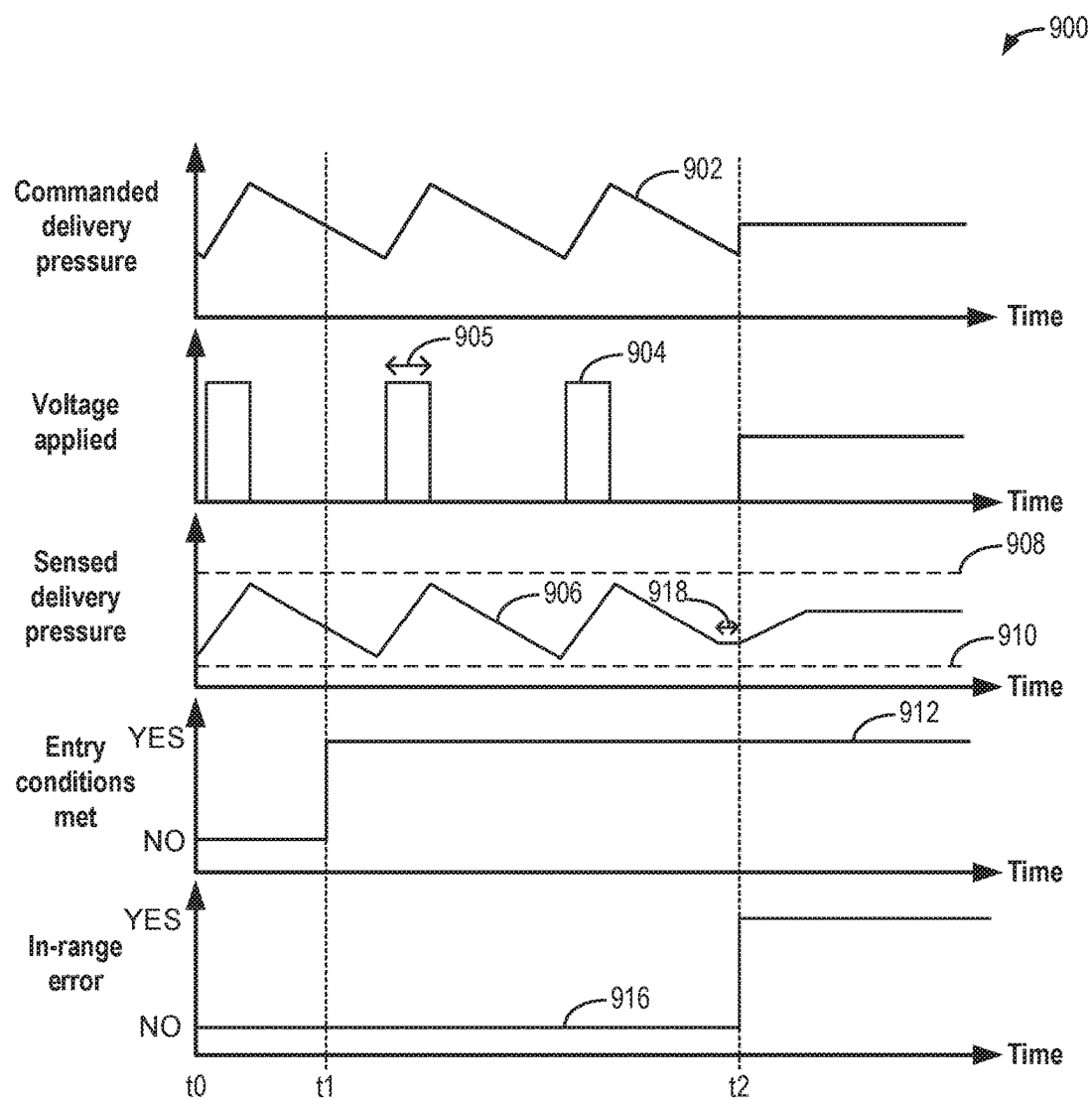
FIG. 9 shows a map of example plots of signals of interest when diagnosing an in-range error in the output of a pressure sensor downstream of a fuel lift pump, in accordance with the routine of FIG. 7, where the error results in trough flattening of the pressure sensor output signal.

FIG. 9 shows an example map 900 illustrating signals of interest for diagnosing an in-range error of a pressure sensor sensing delivery pressure of a lift pump, e.g. in accordance with routine 700 of FIG. 7. Map 900 shows the commanded delivery pressure of the fuel lift pump at plot 902, the voltage applied to the lift pump at plot 904, the sensed delivery pressure at plot 906, an indication of whether entry conditions have been met at plot 912, and an indication of in-range pressure sensor error at plot 916. Additionally, the setpoint pressure is symbolically represented as dashed line 908, and the fuel vapor pressure is symbolically represented as dashed line 910. For all of the above, the X-axis represents time, with time increasing along the X-axis from left to right. The Y-axis of plots 902, 904, and 906 corresponds to the labeled parameter, with the value increasing from bottom to top.

From t0 to t1, the controller is performing closed-loop control of voltage pulses applied to the fuel lift pump (e.g., in accordance with the first or second exemplary feedback control strategy described herein). As shown at plot 904, the voltage pulses applied have a pulse width 905. The pulsed operation produces a sensed delivery pressure waveform with a sawtooth shape, as shown at plot 906. Prior to t1, entry conditions for diagnosing an in-range error of the pressure sensor are not met. For example, engine temperature is below a threshold, the engine is not operating in steady state, and/or other entry conditions are not met. Further, during this time period an in-range error of the pressure sensor is not indicated (e.g., an OBD flag representing an in-range error of the pressure sensor is not set).

At time t1, as shown at plot 912, the controller indicates that the entry conditions for diagnosing an in-range error of the pressure sensor have been met (e.g., in response to measured and/or inferred signals representing values of engine load, engine temperature, etc.). In response to this indication, the controller initiates a routine for diagnosing an in-range error of the pressure sensor, such as routine 700 of FIG. 7. This may include first determining a threshold duration for the sensed delivery pressure to remain constant during proper sensor operation. In map 900, an exemplary threshold duration is shown at 918. The threshold duration may optionally be determined at the controller as a function of the pulse width, e.g., as a fraction of the pulse width. For example, the controller may make a logical determination of an appropriate threshold duration for current engine and fuel system operating conditions, based on logic rules that are a function of the pulse width. In the depicted example, threshold duration 918 is smaller than pulse width 905. It will be appreciated that threshold duration may be substantially smaller than the pulse width (e.g., less than 1/100 of the pulse width), without departing from the scope of this disclosure.

From t1 to t2, the controller performs the diagnostic routine by monitoring the sensed delivery pressure to determine whether it remains constant (e.g., flattens) for more than the threshold duration. As shown at plot 906, the sensor is operating in-range with the expected sawtooth output signal until shortly before t2. However, an in-range error of the sensor begins to occur shortly before t2; at t2, the sensed delivery pressure has remained constant for the threshold duration. In this example, the flattening occurs at the trough of the waveform, which is indicative of the pressure sensor reading high. However, in performing the diagnosis, the controller may ignore the magnitude of the pressure at which the flattening occurs, and thus not distinguish between trough and peak flattening (e.g., the diagnosis is performed independent of the magnitude of pressure at which the sensed signal remains constant). Such operation may advantageously simplify the control strategy.

Upon detecting at t2 that the sensed delivery pressure has remained constant for the threshold duration, the controller indicates an in-range error of the pressure sensor, as shown at plot 916. Further, at t2, the controller switches from closed-loop control of the lift pump, in which voltage pulses are applied to the lift pump, to open-loop control of the lift pump, in which a continuous non-zero voltage is applied to the lift pump. For example, as shown at plot 904, a continuous non-zero voltage is applied to the lift pump starting at t2. In response to the application of the continuous non-zero voltage, the sensed delivery pressure ramps up to a pressure which is higher than an average pressure of the sawtooth waveform, and then remains substantially constant at that pressure (assuming a constant fuel injection rate). The delivery pressure may vary in response to variance of the fuel injection rate that occurs during open-loop operation of the fuel pump, however. By switching to open-loop control of the lift pump when an in-range error of the pressure sensor is identified, the controller no longer relies on inaccurate feedback from pressure sensor. This in turn improves robustness of the control of the lift pump, and reduces the possibility of an inadequate amount of fuel being supplied to the engine cylinders.

In the example shown in map 900, an in-range error of the pressure sensor is indicated as soon as the sensed delivery pressure has remained constant for the threshold duration. In other examples, such as the example shown in map 1000 of FIG. 10, the controller may continue to monitor the sensed delivery pressure during the application of multiple voltage pulses, to ensure that the sensed flattening is not a fluke.

Figure 10:
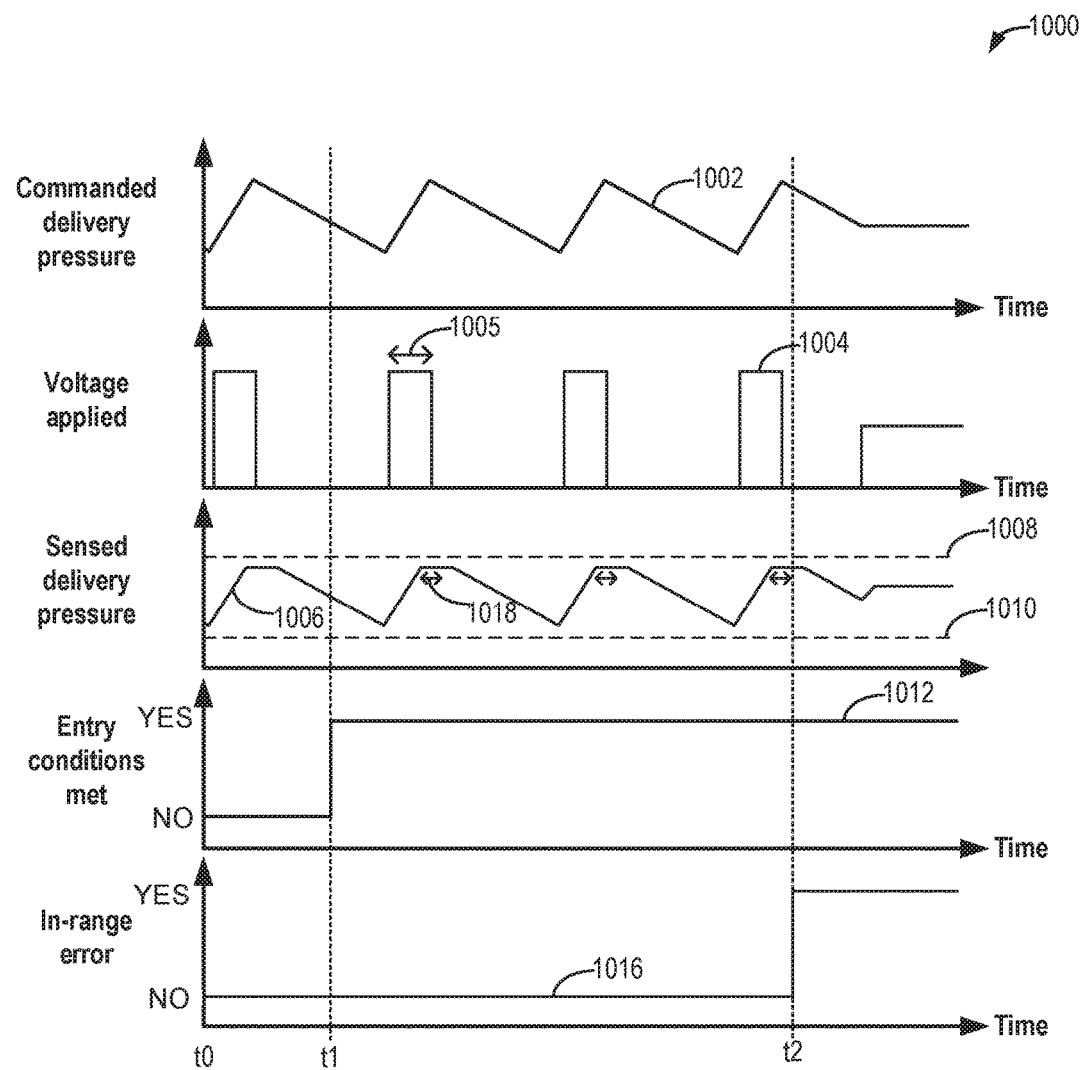
FIG. 10 shows a map of example plots of signals of interest when diagnosing an in-range error in the output of a pressure sensor downstream of a fuel lift pump, in accordance with the routine of FIG. 7, where the error results in peak flattening of the pressure sensor output signal.

Turning now to FIG. 10, it shows another example map 1000 illustrating signals of interest for diagnosing an in-range error of a pressure sensor sensing delivery pressure of a lift pump, e.g. in accordance with routine 700 of FIG. 7. Map 1000 shows the commanded delivery pressure of the fuel lift pump at plot 1002, the voltage applied to the lift pump at plot 1004, the sensed delivery pressure at plot 1006, an indication of whether entry conditions have been met at plot 1012, and an indication of in-range pressure sensor error at plot 1016. Additionally, the setpoint pressure is symbolically represented as dashed line 1008, and the fuel vapor pressure is symbolically represented as dashed line 1010. For all of the above, the X-axis represents time, with time increasing along the X-axis from left to right. The Y-axis of plots 1002, 1004, and 1006 corresponds to the labeled parameter, with the value increasing from bottom to top.

From t0 to t1, the controller is performing closed-loop control of voltage pulses applied to the fuel lift pump, as described above with regard to map 900. However, whereas the closed-loop control shown in map 900 is performed in accordance with either the first or second exemplary feedback control strategy, for example, the closed-loop control shown in map 1000 is not consistent with the second exemplary feedback control strategy (seeing as the control does not get "stuck" when the desired peak pressure is not reached due to flattening). In other examples, however, an in-range error may be detected when flattening occurs at the peak during closed-loop control of the lift pump in accordance with the second exemplary feedback control strategy.

Prior to t1, entry conditions for diagnosing an in-range error of the pressure sensor are not met, and an in-range error of the pressure sensor is not indicated. However, as shown at plot 1006, an in-range error of the pressure sensor is occurring, as evidenced by the flattening of the peaks of the sensed pressure signal.

At time t1, as shown at plot 912, the controller indicates that the entry conditions for diagnosing an in-range error of the pressure sensor have been met, and initiates a routine for diagnosing an in-range error of the pressure sensor, such as routine 700 of FIG. 7. As discussed above with reference to map 900, this may include first determining a threshold duration for the sensed delivery pressure to remain constant during proper sensor operation; an exemplary threshold duration is shown at 1018. In the depicted example, threshold duration 1018 is smaller than pulse width 1005 of the voltage pulses applied to the lift pump.

From t1 to t2, the controller performs the diagnostic routine by monitoring the sensed delivery pressure to determine whether it remains constant (e.g., flattens) for more than the threshold duration. As noted above, at the time the diagnostic routine is initiated, an in-range error of the sensor is already occurring; upon application of the first voltage pulse applied during the diagnostic routine, the sensed delivery pressure rises and then flattens, remaining constant for greater than threshold duration 1018. Whereas in the example diagnostic routine shown in map 900 the controller indicates an in-range error as soon as flattening for the threshold duration is detected, map 1000 shows an example diagnostic routine in the controller waits until multiple separate instances of flattening have been detected before indicating an in-range error. Specifically, in the depicted example, the controller does not indicate an in-range error until the sensed delivery pressure remains constant for the threshold duration for a third time, which occurs at t2. This example is non-limiting; in other examples, the controller may wait to indicate an in-range error until flattening has occurred one, two, three, fourth, five, or more times. Alternatively, another routine for detecting flattening of the sensed pressure signal may be performed by the controller without departing from the scope of this disclosure.

Upon indicating the in-range error, as in map 900, the controller switches from closed-loop control of the lift pump to open-loop control of the lift pump. For example, as shown at plot 1004, a continuous non-zero voltage is applied to the lift pump after t2. As shown, the continuous voltage does not begin to be applied until the sensed delivery pressure has decreased a certain amount from the flattened peak pressure; such operation may be appropriate as the desired delivery pressure may be less than the peak pressure during pulsed operation of the lift pump. However, in other examples, the continuous voltage may be applied as soon as the in-range error is indicated, or the voltage may be ramped up to the continuous voltage, or another strategy for transitioning from pulsed operation to continuous operation of the lift pump may be used. In any case, in response to the application of the continuous non-zero voltage, the sensed delivery pressure ramps up to a pressure which is higher than an average pressure of the sawtooth waveform, and then remains substantially constant at that pressure (assuming a constant fuel injection rate). The delivery pressure may vary in response to variance of the fuel injection rate that occurs during open-loop operation of the fuel pump, however.

Routine 700 and maps 900 and 1000 pertain to diagnosis of an in-range pressure sensor error and corresponding adjustment of lift pump control from closed-loop control to open-loop control. Alternatively, rather than transitioning to open-loop control of the lift pump when an in-range pressure sensor error is occurring, a third exemplary feedback control strategy may be enacted, which is referred to herein as a robust control.

FIG. 11 shows an example routine 1100 for performing robust control of a fuel lift pump in accordance with the third exemplary feedback control strategy. This robust control strategy may advantageously allow for closed-loop feedback control of the lift pump to continue even in the event of pressure sensor degradation or an increase in fuel vapor pressure which has not been recognized by the controller, while minimizing stalling and excessive fuel consumption. Routine 1100 may be performed in conjunction with routine 500 of FIG. 5A at 508, for example.

At 1102, the routine includes turning the lift pump ON. For example, as discussed above with respect to routine 530, this may include the controller adjusting an actuator of the lift pump to apply a predetermined higher voltage level to the lift pump which will quickly raise the delivery pressure to the desired peak pressure (e.g., 8-12 V) determined in routine 500.

After 1102, the routine proceeds to 1104 and the controller determines whether the sensed delivery pressure is less than the desired peak delivery pressure. For example, the controller may receive a signal from a pressure sensor which is indicative of the delivery pressure, and compare this sensed delivery pressure with the stored value of the previously determined desired peak delivery pressure. If the answer at 1104 is YES, indicating that either the delivery pressure has not reached the desired peak pressure or the sensor output is inaccurate, the routine proceeds to 1106.

At 1106, the controller determines whether the duration of time that the lift pump has been ON is less than a calibrated maximum value. The calibrated maximum value may be a predetermined value stored in memory, or alternatively may be determined at the controller as a function of various engine operating parameters (e.g., fuel consumption rate, engine speed, level of voltage applied to the lift pump, etc.) during execution of routine 1100. The calibrated maximum value represents the maximum duration that the lift pump should remain in the ON state during conditions where pressure sensor degradation or some other error prevents the sensed delivery pressure from reaching the desired peak pressure. If the answer at 1106 is YES, the routine returns to 1104. Otherwise, if the answer at 1106 is NO, indicating that the lift pump has been ON for at least the calibrated maximum duration, the routine returns to 1102, or optionally proceeds to 1108.

At 1108, the controller calibrates the output of the pressure sensor, so as to produce a more accurate indication of the actual delivery pressure. When the lift pump remains ON for at least the calibrated maximum duration, this may occur due to flattening of the signal from the sensor which reflects the actual delivery pressure being equal to the setpoint pressure of the pressure relief valve. Such flattening may be determined in accordance with the method of FIG. 7, for example. In one exemplary calibration strategy, upon determination that the lift pump has remained ON for the calibrated maximum duration, the controller proceeds to determine whether the sensed delivery has remained constant for more than a threshold duration (e.g., flattened). If so, going forward, the controller determines a pressure offset as the difference between the pressure relief valve setpoint pressure and the pressure at which the sensed delivery pressure flattened, and calibrates the output of the pressure sensor by adding the offset to the sensed delivery pressure. Thus, the calibrated delivery pressure generated at the controller at a given time may be equal to the sum of the offset and the currently sensed delivery pressure. The calibrated delivery pressure may then be substituted for the sensed delivery pressure in the feedback control performed by the controller, which may advantageously improve the accuracy of the lift pump control and thereby improve fuel economy. This exemplary calibration strategy is illustrated in FIG. 12B, which will be discussed below, and is appropriate when the pressure sensor is consistently reading low. However, other methods of calibration of the sensed delivery pressure may be performed, without departing from the scope of this disclosure.

After 1108, the routine proceeds to 1110. Further, if the answer at 1104 is NO, indicating that the sensed delivery pressure has reached the desired peak delivery pressure, the routine proceeds to 1110. At 1110, the routine includes turning the lift pump OFF. For example, as discussed above with reference to routine 530, this may include the controller adjusting an actuator of the lift pump to apply a predetermined lower voltage level to the lift pump which is low enough to keep the lift pump energized (e.g., greater than 0 V and less than 0.3 V) and which does not substantially increase fuel pressure. In other examples, however, turning the lift pump OFF may include the controller adjusting an actuator of the lift pump to apply 0 V to the lift pump. The predetermined lower voltage level may be determined via execution of routine 500, for example. By turning the lift pump OFF when the ON duration of the lift pump has reached the calibrated maximum duration, regardless of whether the sensed delivery pressure has reached the peak delivery pressure, pulsed operation of the lift pump may continue even when the pressure sensor is degraded. For example, if the sensor is degraded and reading low, the sensed delivery pressure may remain flat at a level which is below the desired peak pressure when normal closed-loop control of the lift pump (e.g., the routine of FIG. 5C) is performed, as the control strategy may not turn the lift pump OFF until the desired peak pressure has been reached. In contrast, the robust control strategy of routine 1100 "resets" the lift pump control when the lift pump has reached the calibrated maximum ON time, regardless of whether the delivery pressure has reached the desired peak delivery pressure.

After 1110, the routine proceeds to 1112 and the controller determines an intended pressure drop ΔP between the peak pressure and the trough pressure, as well as a system stiffness S. The intended pressure drop ΔP represents the desired extent to which the delivery pressure decreases during the time period starting when the lift pump is turned OFF and ending when the lift pump is turned ON again, and may be equal to the difference between the desired peak pressure and the desired trough pressure, for example. System stiffness S may represent the bulk modulus of the fluid within the fuel system (e.g., fuel, or fuel and air). The bulk modulus may be a function of the density of the fluid within the fuel system, and may be represented by the equation $$= \rho \frac{dP}{d\rho},$$

where ρ is the density of the fluid in the fuel system, P is the pressure in the fuel system (e.g., the delivery pressure). The value of S may be obtained at the controller via a lookup table stored in memory at the controller, or alternatively may be calculated at the controller as a function of currently sensed parameter values such as sensed delivery pressure as well as known dimensions of the fuel system (e.g., the volume of a fuel passage within the fuel system) stored in memory at the controller. Notably, as the equation relies on the rate of change of sensed delivery pressure, as opposed to the magnitude of the sensed delivery pressure, it may be possibly to accurately determine S even when the pressure sensor output is offset due to degradation.

After 1112, the routine proceeds to 1114 and the controller determines a volume V of fuel ingested by the engine while the lift pump is OFF which should trigger a transition in the state of the lift pump from OFF to ON. V may be determined at the controller as a function of ΔP and S, for example via the equation $$= \frac{\Delta P}{S},$$

in one non-limiting example. The determined volume V represents the volume of fuel which, when consumed by the engine (e.g., via fuel injection) starting when the delivery pressure is at the desired peak pressure, should reduce the delivery pressure from the desired peak pressure to the desired trough pressure, given the current stiffness S of the fuel system. If the volume V of fuel has been ingested by the engine since the lift pump was turned OFF with the delivery pressure at the desired peak pressure, and yet the sensed delivery pressure is still greater than the desired trough pressure, this may indicate that the pressure sensor is degraded (e.g., reading high) or the fuel vapor pressure is higher than the value stored at the controller.

After 1114, the routine proceeds to 1116 and the controller determines whether the sensed delivery pressure is greater than the desired trough delivery pressure. If the answer at 1116 is NO, indicating that the sensed delivery pressure has reached the desired trough pressure, the routine returns to 1102 to turn the lift pump ON, and another voltage pulse is applied to the lift pump. However, it will be appreciated that routine 1100 may be interrupted at any time (e.g., via a system interrupt) to end the robust feedback control of the lift pump.

Otherwise, if the answer at 1116 is YES, the routine proceeds to 1118 and the controller determines whether the volume of fuel ingested by the engine since the lift pump was turned OFF is greater than the volume V determined at 1114. The volume of fuel ingested by the engine since the lift pump was turned OFF may be equal to the amount of fuel injected to the engine by the fuel system during the time period starting when the lift pump was turned OFF and ending upon execution of 1118, and may be determined at the controller as a function of sensed values and/or data stored in memory regarding the control of the fuel injectors during the time period in question.

If the answer at 1118 is NO, the routine returns to 1116. Otherwise, if the answer at 1118 is YES, the routine returns to 1102, or optionally proceeds to 1120 before returning to 1102.

At 1120, the controller calibrates the output of the pressure sensor sensing delivery pressure, so as to produce a more accurate indication of the actual delivery pressure. When the volume of fuel ingested by the engine since the lift pump was turned OFF is greater than the volume V, this may occur due to flattening of the signal from the sensor which reflects the actual delivery pressure being equal to the fuel vapor pressure. Such flattening may be determined in accordance with the method of FIG. 7, for example. In one exemplary calibration strategy, upon determination that the volume of fuel ingested by the engine since the lift pump was turned OFF is greater than the volume V, the controller proceeds to determine whether the sensed delivery pressure has remained constant for more than a threshold duration (e.g., flattened). If so, going forward, the controller determines a pressure offset as the difference between the pressure at which the sensed delivery pressure flattened and the fuel vapor pressure, and calibrates the output of the pressure sensor by subtracting the offset from the sensed delivery pressure. Thus, the calibrated delivery pressure generated at the controller at a given time may be equal to the currently sensed delivery pressure minus the offset. The calibrated delivery pressure may then be substituted for the sensed delivery pressure in the feedback control performed by the controller, which may advantageously improve engine operation by reducing the possibility of a stall due to low fuel rail pressure. This exemplary calibration strategy is illustrated in FIG. 12D, which will be discussed below, and is appropriate when the pressure sensor is consistently reading high.

After 1120, the routine returns to 1102, or optionally ends if the controller terminates robust feedback control of the lift pump, e.g. due to engine shutdown. By returning to 1102 and turning the lift pump ON when the volume of fuel consumed by the engine reaches a specified level, regardless of whether the sensed delivery pressure has decreased to the desired trough delivery pressure, pulsed operation of the lift pump may continue even when the pressure sensor is degraded. For example, if the sensor is degraded and reading high, the sensed delivery pressure may remain flat at a level which is above the desired trough pressure when normal closed-loop control of the lift pump (e.g., the routine of FIG. 5C) is performed, as the control strategy may not turn the lift pump ON until the desired trough pressure has been reached. In contrast, the robust control strategy of routine 1100 "resets" the lift pump control when a certain amount of fuel has been ingested by the engine, regardless of whether the delivery pressure has reached the desired trough delivery pressure. Such control may advantageously reduce stalling of the engine due to insufficient fuel delivery pressure.

It will be appreciated that if calibration of the sensed delivery pressure is initiated during execution of routine 1100 during a given operating period, the calibrated delivery pressure may be substituted for the sensed delivery pressure in subsequent iterations of routine 1100 during that operating period. Depending on the accuracy of the calibrated delivery pressure, further calibration may not be needed during subsequent execution of routine 1100. Alternatively, if degradation of the pressure sensor escalates, further calibration may be performed.

FIGS. 12A-12D show an example maps illustrating signals of interest during control of the lift pump in accordance with the third exemplary feedback control strategy, e.g. in accordance with routine 1100 of FIG. 11. For the sake of simplicity, in the depicted maps, the engine is operating at steady state, fuel is ingested by the engine at a constant rate, and the magnitude of each voltage pulse applied to the lift pump is the same.

Figure 12A:
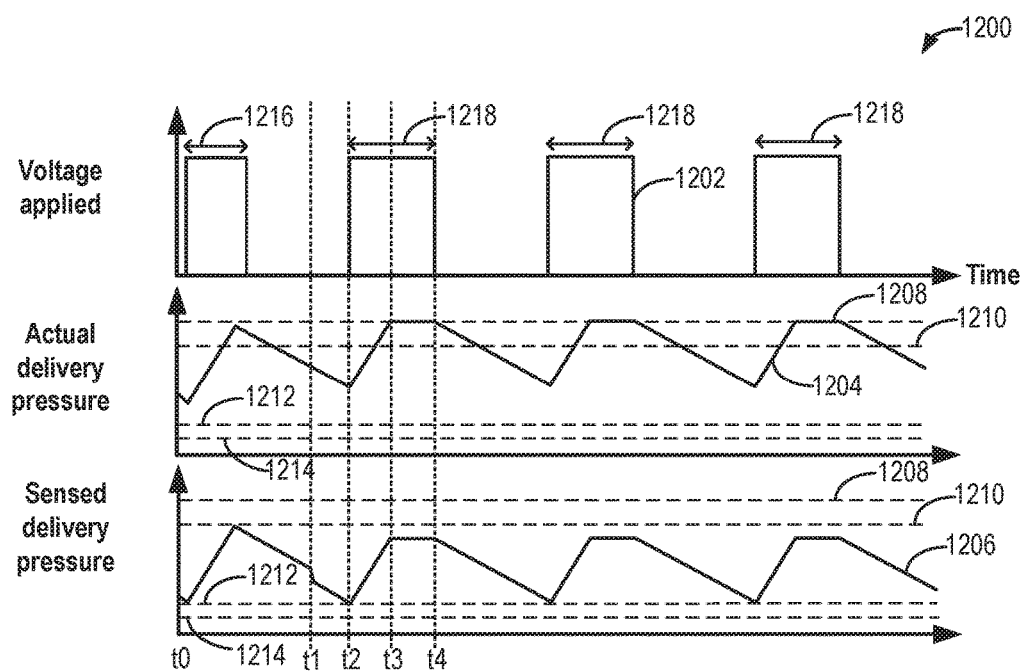
FIGS. 12A-12D show maps of example plots of signals of interest during robust closed-loop control of a fuel lift pump, without calibration of sensor output (FIGS. 12A and 12C), and with calibration of sensor output (FIGS. 12B and 12D).
Figure 12B:
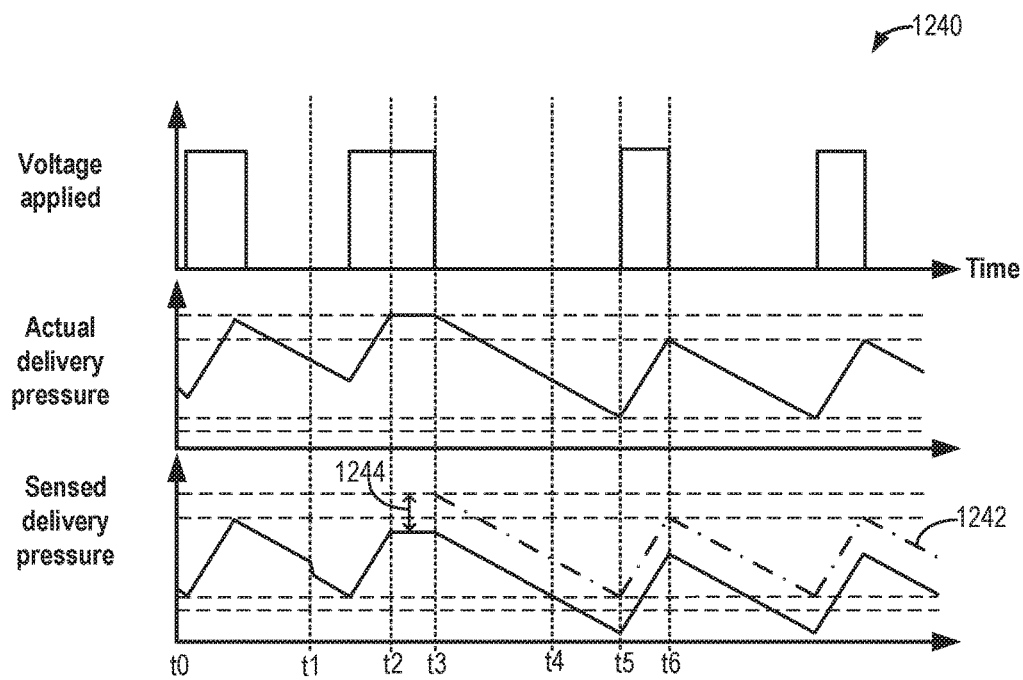

Turning first to FIG. 12A, it shows an example map 1200 which depicts the voltage applied to the lift pump at plot 1202, the actual delivery pressure of the lift pump at plot 1204, and the sensed delivery pressure of the lift pump at plot 1206. For all of these plots, the X-axis represents time, with time increasing along the X-axis from left to right. The Y-axis of each individual plot corresponds to the labeled parameter, with the value increasing from bottom to top. Additionally, line 1208 represents the (actual) pressure relief valve setpoint pressure, line 1210 represents the desired peak delivery pressure, line 1212 represents the desired trough delivery pressure, and line 1214 represents the (actual) fuel vapor pressure.

Shortly after t0, the sensed delivery pressure reaches the desired trough delivery pressure 1212; in response, the controller turns the lift pump ON (e.g., by sending a signal to an actuator of the lift pump). However, the pressure sensor sensing the delivery pressure is reading low; the sensed delivery pressure is lower than the actual delivery pressure by a first amount. Accordingly, the lift pump is turned ON when the actual delivery pressure is higher than the desired trough delivery pressure. Here, the first amount happens to be smaller than the difference between the pressure relief valve setpoint pressure and the desired peak pressure. As such, when the sensed delivery pressure reaches the desired peak pressure, the actual delivery pressure has not yet reached the pressure relief valve setpoint pressure. In response to detecting that the sensed delivery pressure has reached the desired peak pressure, the controller turns the lift pump OFF. Prior to being turned OFF, the lift pump was ON for an ON time 1216, which is less than a calibrated maximum ON time 1218 of the lift pump. After the lift pump is turned off, the actual delivery pressure decreases at a rate which corresponds to the rate at which fuel from the fuel system is ingested by the engine.

At t1, the pressure sensor degrades further and begins reading even lower, such that the sensed delivery pressure is lower than the actual delivery pressure by a second amount, the second amount greater than the first amount. The second amount happens to be larger than the difference between the pressure relief valve setpoint pressure and the desired peak pressure. The sensed delivery pressure decreases to the desired trough pressure at t2, before the actual delivery pressure has decreased to the desired trough pressure (as the pressure sensor is reading low). Here again, the controller turns the lift pump ON at t2 upon detecting that the sensed delivery pressure has reached the desired trough pressure.

At t3, the actual delivery pressure reaches the pressure relief valve setpoint pressure, which causes the pressure relief valve to open and bleed off excess fuel pressure. However, because the difference between the actual delivery pressure and the sensed delivery pressure is greater than the difference between the pressure relief valve setpoint pressure and the desired peak delivery pressure, the sensed delivery pressure has not yet reached the desired peak pressure at t2. Accordingly, the lift pump remains ON, the actual delivery pressure remains constant (flattens) at the pressure relief valve setpoint pressure, and the sensed delivery pressure remains constant (flattens) at a pressure which is below the desired peak pressure.

At t4, the controller detects that the lift pump has remained ON for the calibrated maximum ON time 1218, and in response turns the lift pump OFF, as discussed above with regard to routine 1100. Accordingly, even though the sensed delivery pressure has not reached the desired peak pressure, the length of time that the lift pump has been ON without reaching the desired peak pressure indicates that the output of the sensor may be inaccurate, and the controller turns the lift pump OFF so that pulsed operation may be continued. Such operation is in contrast to the second exemplary feedback control strategy discussed herein, in which the lift pump is only turned OFF when the sensed delivery pressure reaches the desired peak pressure, which can result in the lift pump continuing to be ON even though the actual delivery pressure has exceeded the desired peak pressure and reached the pressure relief valve setpoint pressure.

After t4, the controller continues to turn the lift pump ON when the sensed delivery pressure has decreased to the desired trough pressure, and turn the lift pump OFF when the calibrated maximum ON time has been reached. As shown, because the extent to which the sensor reads low remains constant after t4, the lift pump remains ON for the calibrated maximum ON time 1218 each time a voltage pulse is applied. Thus, although the sensor is degraded and reading low, the robust feedback control strategy enables pulsed operation of the lift pump to be performed, thereby improving fuel economy.

FIG. 12B shows an example map 1240 which illustrates the same signals as map 1200, and also represents lift pump operation in accordance with the third exemplary feedback control strategy. However, in map 1240, the controller initiates calibration of the output of the pressure sensor upon detection that the lift pump has remained ON for the calibrated maximum ON time at t3. Plot 1242 represents the calibrated pressure sensor output.

In the depicted example, the controller determines the calibrated pressure sensor output by adding an offset 1244 to the sensed delivery pressure which is equal to the difference between the pressure relief valve setpoint pressure and the pressure at which the sensed delivery pressure flattened between t2 and t3. From t3 onward, the feedback control is performed based on the calibrated pressure sensor output 1242, rather than the sensed delivery pressure 1206. Accordingly, when the sensed delivery pressure reaches the desired trough pressure at t4, the controller does not turn the lift pump ON; instead, the lift pump remains OFF until the calibrated pressure sensor output reaches the desired trough pressure at t5. Similarly, once the calibrated pressure sensor output reaches the desired peak pressure at t6, the lift pump is turned OFF, even though the sensed delivery pressure has not yet reached the desired peak pressure. As shown, the calibrated pressure sensor output 1242 closely matches the actual delivery pressure 1204 from t3 onward, such that the lift pump may be controlled accurately and efficiently despite the erroneous output of the pressure sensor.

Figure 12C:
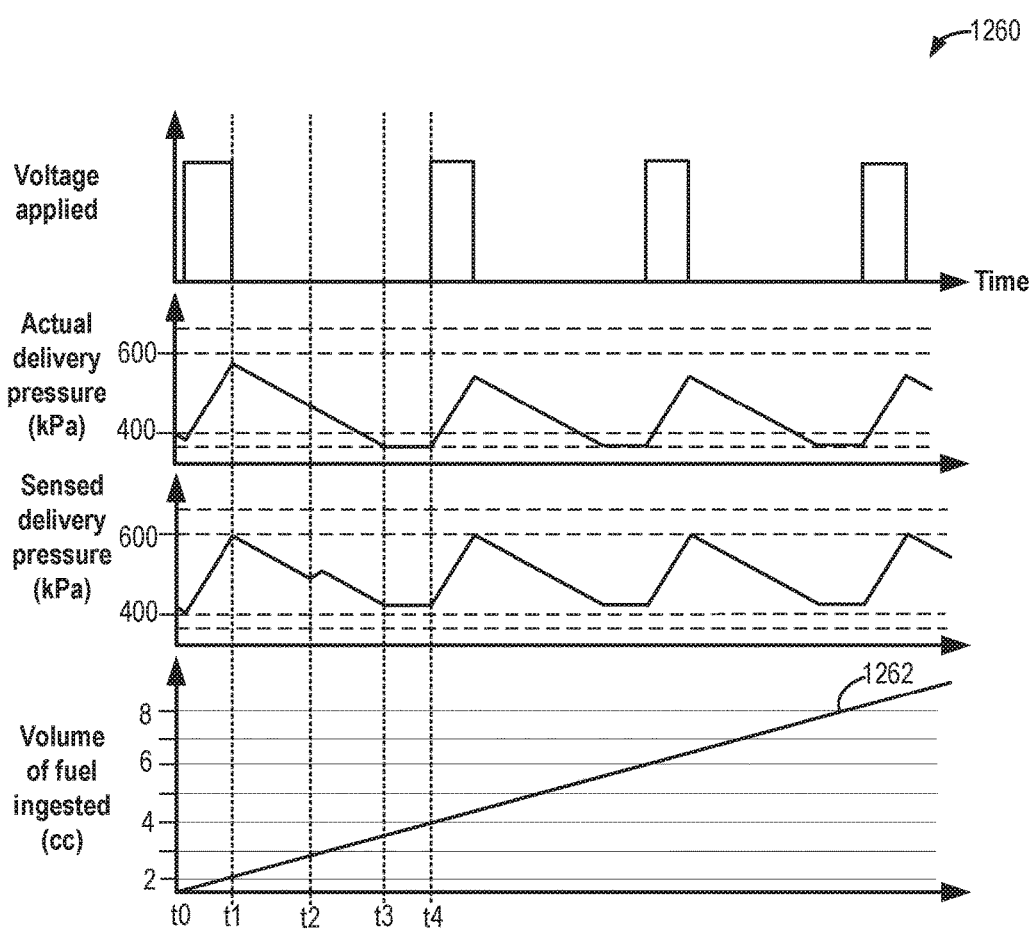
Figure 12D:
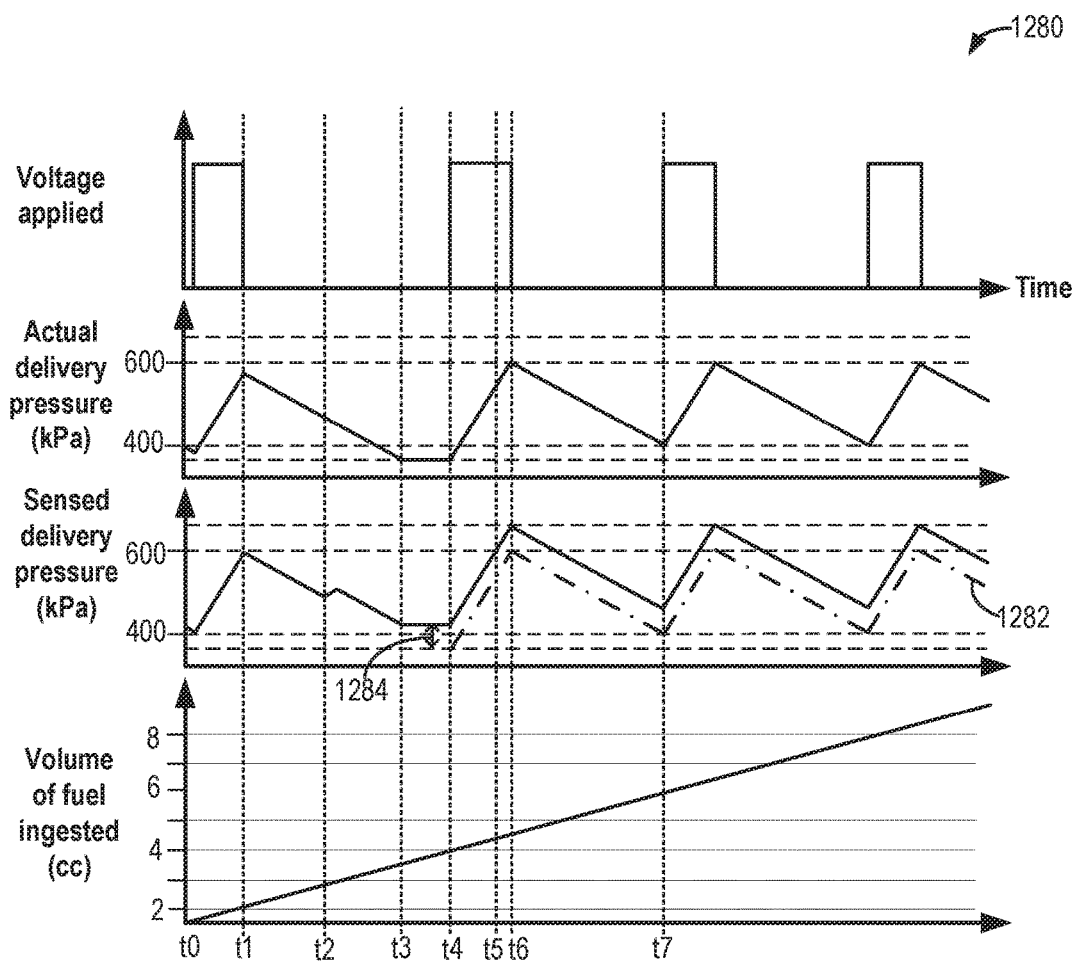

FIG. 12C shows an example map 1260 which illustrates the same signals as map 1200, and also represents lift pump operation in accordance with the third exemplary feedback control strategy. However, whereas maps 1200 and 1240 illustrate lift pump operation during sensor degradation which causes the sensor to read low, map 1260 illustrates lift pump operation during sensor degradation which causes the sensor to read high. Map 1260 additionally illustrates the volume of fuel ingested by the engine at plot 1262, and provides exemplary values for the actual delivery pressure and sensed delivery pressure. Specifically, in the depicted non-limiting example, the desired trough delivery pressure is 400 kPa, and the desired peak delivery pressure is 600 kPa.

Shortly after t0, the sensed delivery pressure has decreased to the desired trough pressure, and thus the controller turns the lift pump ON. At this time, because the sensor is reading high, the actual delivery pressure is less than the desired trough pressure by a first amount. Here, the first amount happens to be smaller than the difference between the desired trough pressure and the fuel vapor pressure. As such, when the sensed delivery pressure reaches the desired trough pressure, the actual delivery pressure has not yet reached the fuel vapor pressure, and thus the signals have not flattened. After the lift pump is turned ON, the actual delivery pressure decreases at a rate which corresponds to the magnitude of voltage applied to the lift pump.

At t1, the sensed delivery pressure reaches the desired peak pressure, and in response the controller turns the lift pump OFF. Because the pressure sensor is reading high, the actual delivery pressure has not yet reached the desired peak pressure. Accordingly, the delivery pressure is lower than the requested delivery pressure for current engine operation.

At t2, the pressure sensor degrades further and begins reading even higher, such that the sensed delivery pressure is higher than the actual delivery pressure by a second amount, the second amount greater than the first amount. The second amount happens to be larger than the difference between the desired trough pressure and the fuel vapor pressure. The actual delivery pressure decreases to the desired trough pressure slightly before t2, and then reaches the fuel vapor pressure at t2 which causes the signal to flatten. Because the pressure sensor is reading high, and because the second amount is larger than the difference between the desired trough pressure and the fuel vapor pressure, the sensed delivery pressure flattens at a pressure higher than the desired trough pressure. Because the sensed delivery pressure has not reached the desired trough pressure, the controller does not turn the lift pump ON, and the actual delivery pressure remains at the fuel vapor pressure. If this were to continue for too long, the engine could stall.

In order to prevent a stall, as discussed above with reference to routine 1100, the controller monitors the volume of fuel ingested by the engine and compares it with a volume V of fuel ingested by the engine while the lift pump is OFF which should trigger a transition in the state of the lift pump from OFF to ON. As noted above, volume V may be equal to the quotient of the intended pressure drop ΔP between the desired peak pressure and the desired trough pressure and a system stiffness S. In the depicted example, the intended pressure drop ΔP is 200 kPa, and the system stiffness S is 100 kPa/cc, and thus volume V is 2 cc. For the sake of example, plot 1262 indicates that 2 cc of fuel has been ingested at t1, 4 cc of fuel has been ingested at t4, and so on; this is simply illustrative, and does not represent actual cumulative quantities of fuel ingested that would occur over the course of engine operation. In other examples, the controller may reset the volume of fuel ingested V to 0 every time the lift pump is turned OFF.

At t1, when the lift pump was turned OFF, the volume of fuel ingested was at 2 cc. At t4, the volume of fuel ingested has reached 4 cc, and thus 2 cc of fuel has been ingested since the lift pump was turned OFF. Since volume V to trigger a transition in the state of the lift pump is set to 2 cc, the controller turns ON the lift pump at t4. Accordingly, even though the sensed delivery pressure has not reached the desired trough pressure, the lift pump is turned ON once the volume V has been ingested, so that pulsed operation may be continued. Such operation is in contrast to the second exemplary feedback control strategy discussed herein, in which the lift pump is only turned back ON when the sensed delivery pressure reaches the desired trough pressure, which can result in the lift pump continuing to be OFF even though the actual delivery pressure has reached the fuel vapor pressure.

After t4, the controller continues to turn the lift pump OFF when the sensed delivery pressure has increased to the desired peak pressure, and turn the lift pump ON when the volume of fuel ingested by the engine since the lift pump was turned OFF reaches 2 cc. Thus, although the sensor is degraded and reading high, the robust feedback control strategy enables pulsed operation of the lift pump to be performed, thereby improving fuel economy.

FIG. 12D shows an example map 1280 which illustrates the same signals as map 1260, and also represents lift pump operation in accordance with the third exemplary feedback control strategy. However, in map 1280, the controller initiates calibration of the output of the pressure sensor upon detection that volume V of fuel has been ingested since the lift pump was turned OFF. Plot 1282 represents the calibrated pressure sensor output.

In the depicted example, the controller determines the calibrated pressure sensor output by subtracting an offset 1284 from the sensed delivery pressure which is equal to the difference between the pressure at which the sensed delivery pressure flattened between t3 and t4 and the fuel vapor pressure. From t4 onward, the feedback control is performed based on the calibrated pressure sensor output 1282, rather than the sensed delivery pressure 1206. Accordingly, when the sensed delivery pressure reaches the desired peak pressure at t5, the controller does not turn the lift pump ON; instead, the lift pump remains OFF until the calibrated pressure sensor output reaches the desired peak pressure at t6. Similarly, once the calibrated pressure sensor output reaches the desired trough pressure at t7, the lift pump is turned OFF, even though the sensed delivery pressure has not yet reached the desired trough pressure. As shown, the calibrated pressure sensor output 1282 closely matches the actual delivery pressure 1204 from t4 onward, such that the lift pump may be controlled accurately and efficiently despite the erroneous output of the pressure sensor.

In accordance with the above description, a method for an engine includes, during pulsed mode operation of a lift pump, adjusting a level of voltage applied to the lift pump based on an output signal of a pressure sensor downstream of the lift pump and monitoring the output signal for flattening; and in response to a detection of flattening, indicating a pressure sensor error and operating the lift pump independent of the output signal of the pressure sensor. In a first example of the method, monitoring the output signal for flattening comprises comparing a duration of time during which a slope of the output signal is zero to a threshold duration. A second example of the method optionally includes the first example and further includes wherein operating the lift pump independent of the output signal of the pressure sensor comprises operating the lift pump in a continuous mode in which a constant non-zero voltage is applied to the lift pump. A third example of the method optionally includes one or more of the first and second examples, and further includes wherein operating the lift pump independent of the output signal of the pressure sensor comprises operating the lift pump in a pulsed mode in which the level of voltage applied to the lift pump is not adjusted based on the output signal of the pressure sensor. A fourth example of the method optionally includes one or more of the first through third examples, and further includes wherein adjusting the level of voltage applied to the lift pump based on the output signal of the pressure sensor comprises adjusting a duty cycle of the voltage pulses based on the output signal. A fifth example of the method optionally includes one or more of the first through fourth examples, and further includes wherein adjusting the duty cycle of the voltage pulses based on the output signal comprises increasing the duty cycle when a peak pressure of the output signal is less than a desired peak pressure, and decreasing the duty cycle when the peak pressure is greater than the desired peak pressure. A sixth example of the method optionally includes one or more of the first through fifth examples, and further includes wherein adjusting the level of voltage applied to the lift pump based on the output signal of the pressure sensor comprises applying a first, higher voltage to the lift pump when the output signal of the pressure sensor decreases to a desired trough pressure and applying a second, lower voltage to the lift pump when the output signal of the pressure sensor increases to a desired peak pressure. A seventh example of the method optionally includes one or more of the first through sixth examples, and further includes, wherein the pressure sensor error is an in-range error, the method further comprising, in response to the output signal increasing above or decreasing below an expected operating range of the pressure sensor, indicating an out-of-range error of the pressure sensor and operating the lift pump independent of the output signal of the pressure sensor.

Further, in accordance with the above description, an additional method for operating an engine fuel system comprises during steady state engine operation with a requested delivery pressure of a fuel lift pump below a first threshold, decreasing a duty cycle of voltage pulses applied to a fuel lift pump until flattening of an output signal of a pressure sensor downstream of the lift pump is detected, and storing the pressure at which the output signal flattened as a fuel vapor pressure of the fuel system; during steady state engine operation with a requested delivery pressure of the fuel lift pump above a second threshold, increasing a duty cycle of voltage pulses applied to the lift pump until flattening of the output signal of the pressure sensor is detected, storing the pressure at which the output signal flattened as a setpoint pressure of a pressure relief valve; and adjusting lift pump operation based on the stored setpoint pressure and fuel vapor pressure.

In a first example of the additional method, adjusting lift pump operation based on the stored setpoint pressure and fuel vapor pressure comprises adjusting a desired peak delivery pressure of the lift pump to be less than the stored setpoint pressure by a first predetermined amount and adjusting a desired trough pressure of the lift pump to be greater than the stored fuel vapor pressure by a second predetermined amount. A second example of the additional method optionally includes the first example and further includes wherein adjusting operation of the lift pump based on the stored setpoint pressure and fuel vapor pressure further comprises, during operation of the lift pump in a pulsed mode, applying a first, higher voltage to the lift pump every time the output signal of the pressure sensor decreases to the desired trough pressure and applying a second, lower voltage to the lift pump every time the output signal of the pressure sensor increases to the desired peak pressure. A third example of the additional method optionally includes one or more of the first and second examples, and further includes wherein adjusting lift pump operation based on the stored setpoint pressure and fuel vapor pressure comprises determining a duty cycle of voltage pulses which, when applied to the lift pump, will produce an output signal having a maximum value at the desired peak delivery pressure and a minimum value at the desired trough delivery pressure, and applying voltage pulses to the lift pump with the determined duty cycle. A fourth example of the additional method optionally includes one or more of the first through third examples, and further includes wherein the requested delivery pressure of the fuel lift pump is directly proportional to engine load. A fifth example of the additional method optionally includes one or more of the first through fourth examples, and further includes, while applying voltage pulses to the lift pump with the determined duty cycle, monitoring the output signal of the pressure sensor for flattening, and in response to a detection of flattening, indicating a pressure sensor error and operating the lift pump independent of the output signal of the pressure sensor. A sixth example of the additional method optionally includes one or more of the first through fifth examples, and further includes wherein operating the lift pump independent of the output signal of the pressure sensor comprises operating the lift pump in a continuous mode in which a constant non-zero voltage is applied to the lift pump or operating the lift pump in a pulsed mode in which the voltage pulses applied to the lift pump are not adjusted based on the output signal of the pressure sensor.

Furthermore, in accordance with the above description, a hybrid vehicle comprises a powertrain comprising an engine, a motor/generator, a battery, and a transmission coupled to vehicle wheels; a fuel system comprising a fuel tank, a fuel lift pump, a pressure sensor arranged downstream of an output of the lift pump in the fuel system, and a pressure relief valve; a controller including non-transitory memory with instructions stored therein which are executable by a processor to: in response to a request to dynamically learn a fuel vapor pressure of the fuel system during pulsed operation of the lift pump with requested vehicle wheel torque above a first threshold, mechanically couple a crankshaft of the engine to the motor/generator, decrease engine load until an output signal of the pressure sensor remains constant for at least a first threshold duration while converting electrical energy to torque with the motor/generator and providing the torque the vehicle wheels, and store the pressure at which the output signal remains constant as the fuel vapor pressure. In a first example of the hybrid vehicle, the controller further comprises instructions stored in non-transitory memory and executable by a processor to: in response to a request to dynamically learn a setpoint pressure of the pressure relief valve during pulsed operation of the lift pump with requested engine output torque below a second threshold, mechanically couple the crankshaft to the motor/generator, increase engine load until the output signal of the pressure sensor remains constant for at least a second threshold duration while converting a portion of engine output torque to electrical energy with the motor/generator and storing the electrical energy at the battery, and store the pressure at which the output signal remains constant as the setpoint pressure. A second example of the hybrid vehicle optionally includes the first example and further includes wherein the controller further comprises instructions stored in non-transitory memory and executable by a processor to: while performing closed-loop control of the lift pump based on an output signal of the pressure sensor, monitor the output signal; in response to the output signal remaining constant for at least a threshold duration, indicate an in-range error of the pressure sensor and switch from closed-loop to open-loop control of the lift pump in which lift pump operation is adjusted independent of the output signal of the pressure sensor. A third example of the hybrid vehicle optionally includes one or more of the first and second examples, and further includes wherein the instructions stored in non-transitory memory and executable by the processor to switch from closed-loop to open-loop control of the lift pump in which lift pump operation is adjusted independent of the output signal of the pressure sensor comprise instructions to apply a continuous non-zero voltage to the lift pump. A fourth example of the hybrid vehicle optionally includes one or more of the first through third examples, and further includes wherein the controller further comprises instructions stored in non-transitory memory and executable by a processor to, after storing the pressure at which the output signal remains constant as the fuel vapor pressure, adjust a duty cycle of voltage pulses applied to the lift pump based on a desired pressure margin between the fuel vapor pressure and lift pump delivery pressure.

Moreover, in accordance with the above description, a method of operating an engine fuel system, comprises during pulsed operation of a lift pump, turning the lift pump OFF when a sensed delivery pressure increases to a desired peak pressure or an ON time of the lift pump reaches a calibrated maximum and turning the lift pump ON when either the sensed delivery pressure decreases to a desired trough pressure or a volume of fuel ingested by the engine reaches a predetermined volume. A first example of this method includes determining the predetermined volume as a function of a difference between the desired peak pressure and the desired trough pressure and a stiffness of the fuel system. A second example of this method optionally includes the first example and further includes wherein the predetermined volume is set equal to the quotient of the difference between the desired peak pressure and the desired trough pressure and the stiffness of the fuel system. A third example of this method optionally includes one or more of the first and second examples, and further includes determining the stiffness of the fuel system as a function of a density of fluid within the fuel system. A fourth example of this method optionally includes one or more of the first through third examples, and further includes, in response to the ON time of the lift pump reaching the calibrated maximum, indicating an in-range error of the pressure sensor and initiating calibration of the sensed delivery pressure, the calibration including adding an offset to the sensed delivery pressure. A fifth example of this method optionally includes one or more of the first through fourth examples, and further includes wherein the offset is equal to the difference between a setpoint pressure of a pressure relief valve and the sensed delivery pressure when the ON time reached the calibrated maximum. A sixth example of this method optionally includes one or more of the first through fifth examples, and further includes, in response to the volume of fuel ingested by the engine reaching the predetermined volume, indicating an in-range error of the pressure sensor and initiating calibration of the sensed delivery pressure, the calibration including subtracting an offset from the sensed delivery pressure. A seventh example of this method optionally includes one or more of the first through sixth examples, and further includes wherein the offset is equal to the difference between the sensed delivery pressure when the volume of fuel ingested by the engine reached the predetermined volume and a fuel vapor pressure of the fuel system.

Yet another method in accordance with the present disclosure includes, while performing closed-loop control of a lift pump based on an output signal of a pressure sensor arranged downstream of the lift pump, monitoring the output signal; in response to the output signal remaining constant for at least a first threshold duration while the lift pump is ON, turning the lift pump OFF, calibrating the output signal based on the pressure at which the output signal remained constant, and performing subsequent closed-loop control of the lift pump based on the calibrated output signal; in response to the output signal remaining constant for at least a second threshold duration while the lift pump is OFF, turning the lift pump ON, calibrating the output signal based on the pressure at which the output signal remained constant, and performing subsequent closed-loop control of the lift pump based on the calibrated output signal. A first example of this method includes wherein calibrating the output signal based on the pressure at which the output signal remained constant while the lift pump was ON comprises adding a first offset to the output signal, the first offset equal to the difference between a setpoint pressure of a pressure relief valve and the pressure at which the output signal remained constant while the lift pump was ON. A second example of this method optionally includes the first example and further includes wherein calibrating the output signal based on the pressure at which the output signal remained constant while the lift pump was OFF comprises subtracting a second offset from the output signal, the second offset equal to the difference between the pressure at which the output signal remained constant while the lift pump was OFF and a fuel vapor pressure of the fuel system. A third example of this method optionally includes one or more of the first and second examples, and further includes determining the first threshold duration by subtracting an ON time of the lift pump prior to the output signal reaching the pressure at which it remained constant from a calibrated maximum ON time. A fourth example of this method optionally includes one or more of the first through third examples, and further includes determining the second threshold duration based on a current rate of fuel ingestion by the engine and a difference between a predetermined volume of fuel and a volume of fuel ingested by the lift pump since the lift pump was turned OFF prior to the output signal reaching the pressure at which it remained constant. A fifth example of this method optionally includes one or more of the first through fourth examples, and further includes wherein the predetermined volume of fuel is determined as a function of a difference between a desired peak delivery pressure and a desired trough delivery pressure and a stiffness of the fuel system. A sixth example of this method optionally includes one or more of the first through fifth examples, and further includes wherein the predetermined volume is set equal to the quotient of the difference between the desired peak pressure and the desired trough pressure and the stiffness of the fuel system, and where the stiffness of the fuel system is determined as a function of a density of fluid within the fuel system.

Additionally, in accordance with the above description, a hybrid vehicle comprises a powertrain comprising an engine, a motor/generator, a battery, and a transmission coupled to vehicle wheels; a fuel system comprising a fuel tank, a fuel lift pump, a pressure sensor arranged downstream of an output of the lift pump in the fuel system, and a pressure relief valve; and a controller including non-transitory memory with instructions stored therein which are executable by a processor to: during pulsed operation of a lift pump, monitor a volume of fuel ingested by the engine while the lift pump is OFF; if the volume of fuel ingested by the engine while the lift pump is OFF reaches a predetermined volume before an output signal of the pressure sensor has decreased to a desired trough pressure, turn the lift pump ON, store the value of the output signal of the pressure sensor as a first stored value, and request dynamic learning of a fuel vapor pressure of the fuel system; if a requested vehicle wheel torque is above a first threshold, mechanically couple a crankshaft of the engine to the motor/generator, decrease engine load until the output signal of the pressure sensor remains constant for at least a first threshold duration while converting electrical energy to torque with the motor/generator and providing the torque the vehicle wheels, and store the pressure at which the output signal remains constant as an updated fuel vapor pressure; and if the updated fuel vapor pressure is less than the first stored value, indicate that the pressure sensor is reading high. In a first example of the hybrid vehicle, the controller further comprises instructions stored in non-transitory memory and executable by a processor to: during pulsed operation of the lift pump, monitor an ON time of the lift pump; if the ON time of the lift pump reaches a calibrated maximum ON time before the output signal of the pressure sensor has increased to a desired peak pressure, turn the lift pump OFF, store the value of the output signal of the pressure sensor as a second stored value, and request dynamic learning of a setpoint pressure of the pressure relief valve; if the requested engine output torque is below a second threshold, mechanically couple the crankshaft to the motor/generator, increase engine load until the output signal of the pressure sensor remains constant for at least a second threshold duration while converting a portion of engine output torque to electrical energy with the motor/generator and storing the electrical energy at the battery, and store the pressure at which the output signal remains constant as an updated setpoint pressure; and if the updated setpoint pressure is greater than the second stored value, indicate that the pressure sensor is reading low. A second example of the hybrid vehicle optionally includes the first example and further includes wherein the controller further comprises instructions stored in non-transitory memory and executable by a processor to: in response to an indication that the pressure sensor is reading high, initiating calibration of the output signal of the pressure sensor, the calibration including subtracting a first offset from the output signal of the pressure sensor. A third example of the hybrid vehicle optionally includes one or more of the first and second examples, and further includes wherein the controller further comprises instructions stored in non-transitory memory and executable by a processor to: in response to an indication that the pressure sensor is reading low, initiating calibration of the output signal of the pressure sensor, the calibration including adding a second offset to the output signal of the pressure sensor. A fourth example of the hybrid vehicle optionally includes one or more of the first through third examples, and further includes wherein the controller further comprises instructions stored in non-transitory memory and executable by a processor to set the first offset equal to the difference between the first stored value and the updated fuel vapor pressure, and to set the second offset equal to the difference between the updated setpoint pressure and the second stored value.

In accordance with the methods and systems disclosed herein, in-range errors of a pressure sensor measuring lift pump delivery pressure may be detected accurately. In response to detection of an in-range error of the pressure sensor, lift pump control may be switched from a closed-loop control strategy, in which a duty cycle of voltage pulses applied to the lift pump is adjusted based on feedback from the pressure sensor, to an open-loop control strategy, in which the voltage applied to the lift pump is independent of feedback from the pressure sensor. Notably, the detection of in-range errors may include detection of flattening of sensed pressure without consideration of the magnitude of the sensed pressure, which has the technical effect of identifying degradation of the pressure sensor even when the pressure sensor is operating within its expected operating range, and which may advantageously reduce control complexity. Further, switching from closed-loop control to open-loop control of the lift pump upon detection of an in-range error may allow the fuel system to continue provided a commanded delivery pressure despite the malfunctioning of the pressure sensor. Alternatively, in accordance with the methods and systems disclosed herein, a robust closed-loop feedback control strategy may be performed, which enables closed-loop pulsed operation of the lift pump to continue even when flattening of the pressure sensor output has indicated that the sensor is degraded.

In another representation, a method in accordance with the present disclosure may include, with a controller, adjusting operation of a fuel lift pump of an engine fuel system to dynamically learn a setpoint pressure of a pressure relief valve in the fuel system and a fuel vapor pressure of the fuel system; adjusting operation of the lift pump to maintain a first desired margin between a maximum delivery pressure and the setpoint pressure and a second desired margin between a minimum delivery pressure and the fuel vapor pressure; and monitoring the delivery pressure with a pressure sensor arranged downstream of the lift pump for a deviation from an expected slope of the sensed delivery pressure signal. The deviation may include the signal having a slope of zero for longer than a predetermined threshold duration.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of operating an engine fuel system, comprising:
during pulsed mode operation of a lift pump, adjusting a level of voltage applied to the lift pump based on an output signal of a pressure sensor downstream of the lift pump and monitoring the output signal for flattening;
in response to a detection of flattening, indicating a pressure sensor error and operating the lift pump independent of the output signal of the pressure sensor.

2. The method of claim 1, wherein monitoring the output signal for flattening comprises comparing a duration of time during which a slope of the output signal is zero to a threshold duration.

3. The method of claim 2, wherein operating the lift pump independent of the output signal of the pressure sensor comprises operating the lift pump in a continuous mode in which a constant non-zero voltage is applied to the lift pump.

4. The method of claim 2, wherein operating the lift pump independent of the output signal of the pressure sensor comprises operating the lift pump in a pulsed mode in which the level of voltage applied to the lift pump is not adjusted based on the output signal of the pressure sensor.

5. The method of claim 1, wherein adjusting the level of voltage applied to the lift pump based on the output signal of the pressure sensor comprises adjusting a duty cycle of the voltage pulses based on the output signal.

6. The method of claim 5, wherein adjusting the duty cycle of the voltage pulses based on the output signal comprises increasing the duty cycle when a peak pressure of the output signal is less than a desired peak pressure, and decreasing the duty cycle when the peak pressure is greater than the desired peak pressure.

7. The method of claim 1, wherein adjusting the level of voltage applied to the lift pump based on the output signal of the pressure sensor comprises applying a first, higher voltage to the lift pump when the output signal of the pressure sensor decreases to a desired trough pressure and applying a second, lower voltage to the lift pump when the output signal of the pressure sensor increases to a desired peak pressure.

8. The method of claim 2, wherein the pressure sensor error is an in-range error, the method further comprising, in response to the output signal increasing above or decreasing below an expected operating range of the pressure sensor, indicating an out-of-range error of the pressure sensor and operating the lift pump independent of the output signal of the pressure sensor.

9. A method for operating an engine fuel system, comprising:
during steady state engine operation with a requested delivery pressure of a fuel lift pump below a first threshold, decreasing a duty cycle of voltage pulses applied to a fuel lift pump until flattening of an output signal of a pressure sensor downstream of the lift pump is detected, storing the pressure at which the output signal flattened as a fuel vapor pressure of the fuel system;
during steady state engine operation with a requested delivery pressure of the fuel lift pump above a second threshold, increasing a duty cycle of voltage pulses applied to the lift pump until flattening of the output signal of the pressure sensor is detected, and storing the pressure at which the output signal flattened as a setpoint pressure of a pressure relief valve; and
adjusting lift pump operation based on the stored setpoint pressure and fuel vapor pressure.

10. The method of claim 9, wherein adjusting lift pump operation based on the stored setpoint pressure and fuel vapor pressure comprises adjusting a desired peak delivery pressure of the lift pump to be less than the stored setpoint pressure by a first predetermined amount and adjusting a desired trough pressure of the lift pump to be greater than the stored fuel vapor pressure by a second predetermined amount.

11. The method of claim 10, wherein adjusting operation of the lift pump based on the stored setpoint pressure and fuel vapor pressure further comprises, during operation of the lift pump in a pulsed mode, applying a first, higher voltage to the lift pump every time the output signal of the pressure sensor decreases to the desired trough pressure and applying a second, lower voltage to the lift pump every time the output signal of the pressure sensor increases to the desired peak pressure.

12. The method of claim 10, wherein adjusting lift pump operation based on the stored setpoint pressure and fuel vapor pressure comprises determining a duty cycle of voltage pulses which, when applied to the lift pump, will produce an output signal having a maximum value at the desired peak delivery pressure and a minimum value at the desired trough delivery pressure, and applying voltage pulses to the lift pump with the determined duty cycle.

13. The method of claim 9, wherein the requested delivery pressure of the fuel lift pump is directly proportional to engine load.

14. The method of claim 12, further comprising, while applying voltage pulses to the lift pump with the determined duty cycle, monitoring the output signal of the pressure sensor for flattening, and in response to a detection of flattening, indicating a pressure sensor error and operating the lift pump independent of the output signal of the pressure sensor.

15. The method of claim 14, wherein operating the lift pump independent of the output signal of the pressure sensor comprises operating the lift pump in a continuous mode in which a constant non-zero voltage is applied to the lift pump or operating the lift pump in a pulsed mode in which the voltage pulses applied to the lift pump are not adjusted based on the output signal of the pressure sensor.

16. A hybrid vehicle, comprising:
a powertrain comprising an engine, a motor/generator, a battery, and a transmission coupled to vehicle wheels;
a fuel system comprising a fuel tank, a fuel lift pump, a pressure sensor arranged downstream of an output of the lift pump in the fuel system, and a pressure relief valve;
a controller including non-transitory memory with instructions stored therein which are executable by a processor to:
in response to a request to dynamically learn a fuel vapor pressure of the fuel system during pulsed operation of the lift pump with requested vehicle wheel torque above a first threshold, mechanically couple a crankshaft of the engine to the motor/generator, decrease engine load until an output signal of the pressure sensor remains constant for at least a first threshold duration while converting electrical energy to torque with the motor/generator and providing the torque the vehicle wheels, and store the pressure at which the output signal remains constant as the fuel vapor pressure.

17. The hybrid vehicle of claim 16, wherein the controller further comprises instructions stored in non-transitory memory and executable by a processor to:
in response to a request to dynamically learn a setpoint pressure of the pressure relief valve during pulsed operation of the lift pump with requested engine output torque below a second threshold, mechanically couple the crankshaft to the motor/generator, increase engine load until the output signal of the pressure sensor remains constant for at least a second threshold duration while converting a portion of engine output torque to electrical energy with the motor/generator and storing the electrical energy at the battery, and store the pressure at which the output signal remains constant as the setpoint pressure.

18. The hybrid vehicle of claim 17, wherein the controller further comprises instructions stored in non-transitory memory and executable by a processor to:
while performing closed-loop control of the lift pump based on an output signal of the pressure sensor, monitor the output signal;
in response to the output signal remaining constant for at least a threshold duration, indicate an in-range error of the pressure sensor and switch from closed-loop to open-loop control of the lift pump in which lift pump operation is adjusted independent of the output signal of the pressure sensor.

19. The hybrid vehicle of claim 18, wherein the instructions stored in non-transitory memory and executable by the processor to switch from closed-loop to open-loop control of the lift pump in which lift pump operation is adjusted independent of the output signal of the pressure sensor comprise instructions to apply a continuous non-zero voltage to the lift pump.

20. The hybrid vehicle of claim 16, wherein the controller further comprises instructions stored in non-transitory memory and executable by a processor to, after storing the pressure at which the output signal remains constant as the fuel vapor pressure, adjust a duty cycle of voltage pulses applied to the lift pump based on a desired pressure margin between the fuel vapor pressure and lift pump delivery pressure.

* * * * *